(12) United States Patent
Ooi et al.

(10) Patent No.: US 8,850,337 B2
(45) Date of Patent: Sep. 30, 2014

(54) INFORMATION PROCESSING DEVICE, AUTHORING METHOD, AND PROGRAM

(75) Inventors: Kenichirou Ooi, Kanagawa (JP); Shunichi Homma, Tokyo (JP); Yoshiaki Iwai, Tokyo (JP); Akihiko Kaino, Kanagawa (JP); Jianing Wu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/368,867

(22) Filed: Feb. 8, 2012

(65) Prior Publication Data

US 2012/0210255 A1   Aug. 16, 2012

(30) Foreign Application Priority Data

Feb. 15, 2011 (JP) ................. 2011-030006

(51) Int. Cl.
*G06F 3/00* (2006.01)
*G06F 3/048* (2013.01)
*G06T 19/00* (2011.01)

(52) U.S. Cl.
CPC ........... *G06T 19/006* (2013.01); *G06T 2200/24* (2013.01)
USPC .......................................... 715/762; 715/757

(58) Field of Classification Search
CPC ........ G06F 9/4443; G06F 8/38; G06F 3/0481
USPC ................................................ 715/762, 757
See application file for complete search history.

(56) References Cited

U.S. PATENT DOCUMENTS

| | | | |
|---|---|---|---|
| 6,037,914 A * | 3/2000 | Robinson ........................... 345/7 |
| 6,057,856 A * | 5/2000 | Miyashita et al. ............. 345/633 |
| 7,053,916 B2 * | 5/2006 | Kobayashi et al. ........... 345/633 |
| 7,215,322 B2 * | 5/2007 | Genc et al. ..................... 345/157 |
| 7,376,903 B2 * | 5/2008 | Morita et al. .................. 715/757 |
| 7,379,060 B2 * | 5/2008 | Kobayashi et al. ........... 345/419 |
| 7,391,424 B2 * | 6/2008 | Lonsing ......................... 345/633 |
| 7,812,815 B2 * | 10/2010 | Banerjee et al. .............. 345/156 |
| 8,040,361 B2 * | 10/2011 | Bachelder et al. ............ 345/633 |

(Continued)

FOREIGN PATENT DOCUMENTS

JP    2008-304268    12/2008

OTHER PUBLICATIONS

Steven Fiener, "A Touring Machine: Prototyping 3D Mobile Augmented Reality Systems for Exploring the Urban Environment", In: Personal Technologies, 1997, p. 208-217.*

(Continued)

*Primary Examiner* — David Phantana Angkool
(74) *Attorney, Agent, or Firm* — Finnegan, Henderson, Farabow, Garrett & Dunner, L.L.P.

(57) ABSTRACT

There is provided an information processing device including an image acquisition unit configured to acquire an input image of a real space captured with an imaging device, a user interface unit configured to display the input image on a screen of a display device and detect a designated position designated by a user on the screen, a computation unit configured to compute a three-dimensional position of a virtual object in an augmented reality space from the designated position detected by the user interface unit, and an authoring unit configured to associate the three-dimensional position of the virtual object computed by the computation unit with the virtual object to store the three-dimensional position in a storage medium.

10 Claims, 24 Drawing Sheets

(56) References Cited

U.S. PATENT DOCUMENTS

| | | | | |
|---|---|---|---|---|
| 8,102,334 B2* | 1/2012 | Brown et al. | | 345/8 |
| 8,190,295 B1* | 5/2012 | Garretson et al. | | 700/245 |
| 8,379,056 B2* | 2/2013 | Fruehauf et al. | | 345/633 |
| 8,390,534 B2* | 3/2013 | Hamadou et al. | | 345/8 |
| 2010/0185529 A1* | 7/2010 | Chesnut et al. | | 705/27 |
| 2011/0310227 A1* | 12/2011 | Konertz et al. | | 348/46 |
| 2012/0086728 A1* | 4/2012 | McArdle et al. | | 345/633 |
| 2012/0117514 A1* | 5/2012 | Kim et al. | | 715/849 |

OTHER PUBLICATIONS

Langlotz et al., "Sketching up the world: in situ authoring for mobile Augmented Reality". Dec. 9, 2012, XP55029083.

Mooslechner Stefan: "Content Creation for Augmented Reality on Mobile Devices", Jun. 2010, XP55029086.

Unknown: Sketching up the World: in situ Authoring for mobile Augmented Reality. Youtube Video, Jan. 12, 2011.

Simon G et al.: "Markerless tracking suing planar structures in the scene" Oct. 5, 2000, SP0105202321.

English-language European Search Report in corresponding EP 12 15 3989.4, dated Jun. 19, 2012.

W. Daniel, et al, "Pose Tracking From Natural Features on Mobile Phones", Graz University of Technology and University of Cambriged: Nov. 11, 2011.

A. Van Den Hengel, et al., "In Situ Image Eased Modeling", School of Computer Science, University of Adelaide, Australia, Nov. 11, 2011.

Davison A., "Real-Time Simultaneous Localisation and Mapping with a Single Camera," Proc. of the $9^{th}$ IEEE International Conference on Computer Vision, vol. 2, 2003, pp. 1403-1410 (8 pages).

* cited by examiner

| OBJECT ID | DESCRIPTION | POSITION | ATTITUDE | FACE | NORMAL LINE | VERTICES |
|---|---|---|---|---|---|---|
| B1 | ABC BUILDING | $X_{B1}$ | $R_{B1}$ | $F_{11}$ | $n_{11}$ | $X'_{111}$ |
| | | | | ⋮ | ⋮ | ⋮ |
| B2 | SIGN ON ROOF | $X_{B2}$ | $R_{B2}$ | $F_{21}$ | $n_{21}$ | $X'_{211}$ |
| | | | | ⋮ | ⋮ | ⋮ |
| ⋮ | ⋮ | ⋮ | ⋮ | ⋮ | ⋮ | ⋮ |

REAL SPACE MODEL

LOCAL COORDINATE SYSTEM X'

| OBJECT ID | DESCRIPTION | FACE | NORMAL LINE | VERTICES |
|---|---|---|---|---|
| B8 | VEHICLE | $F_{81}$ | $n_{81}$ | $X'_{811}$ |
|  |  |  |  | ⋮ |
|  |  | ⋮ | ⋮ | ⋮ |
| B9 | NOTEBOOK PC | $F_{91}$ | $n_{91}$ | $X'_{911}$ |
|  |  |  |  | ⋮ |
|  |  | ⋮ | ⋮ | ⋮ |
|  |  | ⋮ | ⋮ | ⋮ |

OBJECT MODEL

FIG.12

| ID | DESCRIPTION | TYPE | FACE | TRANSPARENT | CONTACT | REFERENCE POINT | REFERENCE LINE | NORMAL LINE | VERTICES |
|---|---|---|---|---|---|---|---|---|---|
| V1 | ADVERTISEMENT A | PLANAR | $F_A$ | No | | $P_A$ | $L_A$ | $n_A$ | $X'_{A1}$, ... |
| V2 | CONTAINER B | PLANAR | $F_B$ | No | | $P_B$ | $L_B$ | $n_B$ | $X'_{B1}$, ... |
| V3 | STEREOSCOPIC OBJECT C | STEREOSCOPIC | $F_{C1}$ | No | No | | | $n_{C1}$ | $X'_{C11}$, ... |
| | | | $F_{C2}$ | No | Yes | $P_{C2}$ | $L_{C2}$ | $n_{C2}$ | $X'_{C21}$, ... |
| V4 | SPHERICAL OBJECT D | STEREOSCOPIC | $F_{DZ}$ | Yes | Yes | $P_{DZ}$ | $L_{DZ}$ | $n_{DZ}$ | $X'_{DZ1}$, ... |
| ... | ... | | ... | ... | ... | ... | ... | ... | ... |

VD ↙ VIRTUAL OBJECT DATA

| INSTANCE ID | OBJECT ID | COORDINATE TYPE | ASSOCIATED OBJECT | POSITION | ATTITUDE |
|---|---|---|---|---|---|
| IS11 | V1 | GLOBAL |  | $X_{IS11}$ | $R_{IS11}$ |
| IS12 | V1 | LOCAL | B2 | $X'_{IS12}$ | $R'_{IS12}$ |
| IS13 | V1 | LOCAL | B8 | $X'_{IS13}$ | $R'_{IS13}$ |
| IS21 | V2 | GLOBAL |  | $X'_{IS21}$ | $R'_{IS21}$ |
| ⋮ | ⋮ | ⋮ | ⋮ | ⋮ | ⋮ |

INSTANCE DATA

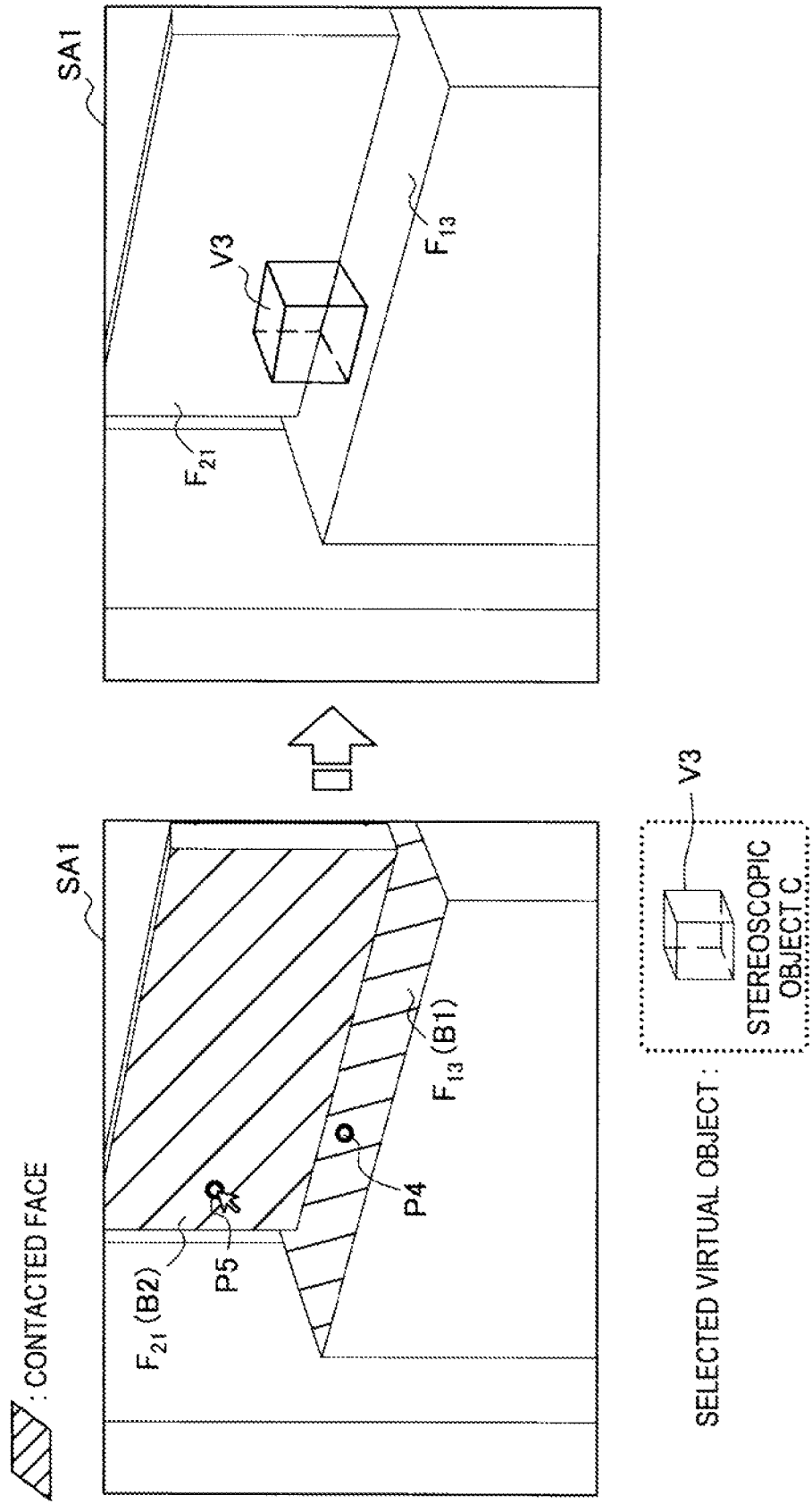

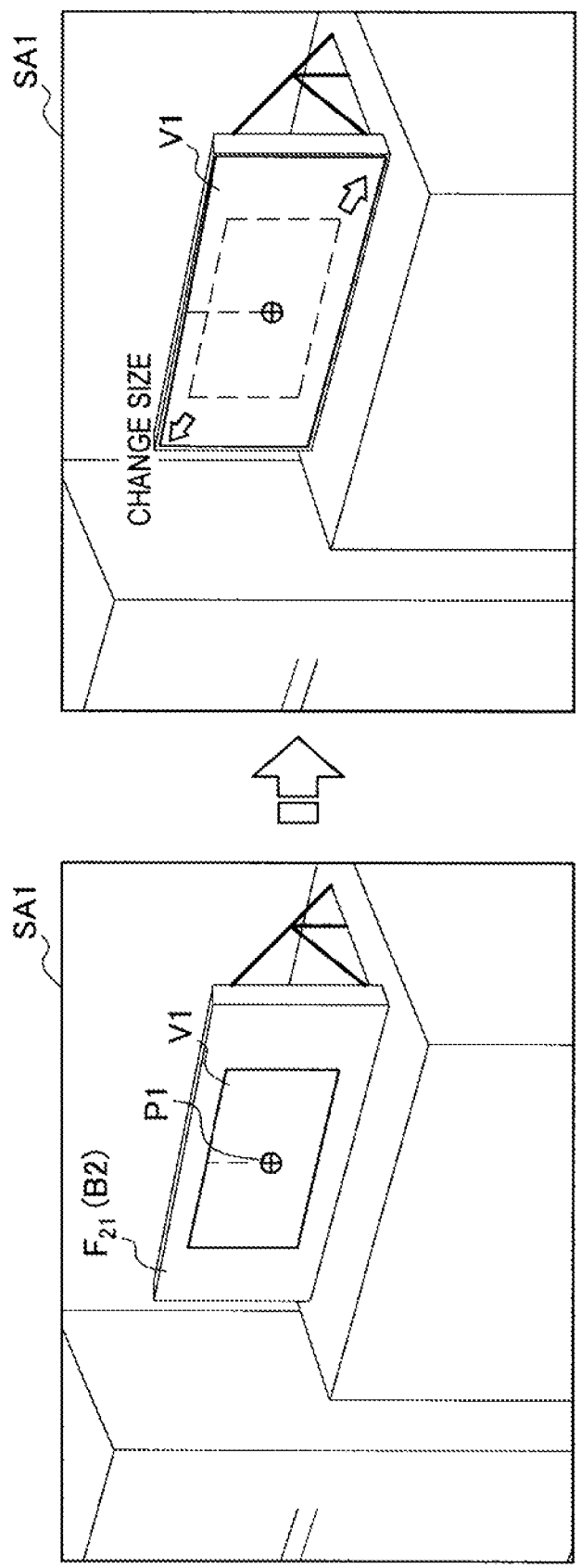

INFORMATION PROCESSING DEVICE, AUTHORING METHOD, AND PROGRAM

BACKGROUND

The present disclosure relates to an information processing device, an authoring method, and a program.

In recent years, a technology called augmented reality (AR) has been drawing attention in which a real world with additional information overlaid thereon is presented to a user. Information presented to a user in the AR technology is also called an annotation, and can be visualized using virtual objects in various forms such as text, icons, or animations. For example, when the AR technology is used for advertisement, a virtual object for advertisement (e.g., an image of a product with a catch copy added thereto) can be displayed such that it is overpaid on a wall surface of a building or a sign in the real world. Meanwhile, when the AR technology is used for navigation, a virtual object (e.g., an arrow) for navigation can be displayed such that it is overlaid on a target real object, road, or the like in the real world.

An operation of creating AR content is a kind of so-called authoring. A developer user who authors AR content determines which virtual object should be arranged at which position and in what attitude in a three-dimensional space. The thus determined arrangement of the virtual object is associated with a specific place or a specific real object in the real world and is stored as data.

Reference 1 (A. van den Hengel, R. Hill, B. Ward and A. Dick, "In Situ Image-based Modeling" (In Proc. 8th IEEE International Symposium on Mixed and Augmented Reality, 2009)) shows an example of a technique for modeling a real space at the stage before the arrangement of a virtual object. Reference 2 (W. Daniel, G. Reitmayr, A. Mulloni, T. Drummond, and D. Schmalstieg, "Pose Tracking from Natural Features on Mobile Phones" (In Proc. 7th IEEE International Symposium on Mixed and Augmented Reality, 2008)) shows an example of a technique of using a natural marker with the objective of computing the position and the attitude of an imaging device that are needed for overlaying a virtual object on the captured image.

SUMMARY

However, with the authoring operations to date, a specialized knowledge about coordinate transformation, CAD Computer Aided Design), and the like has been needed to adequately arrange a virtual object in the AR space. That is, it has been only an expert with a specialized knowledge who is able to author AR content. Under such circumstances, it is difficult to supply a variety of types of AR content in large quantities to the market and to allow end users to enjoy the benefits of the AR technology.

In light of the foregoing, it is desirable to provide an information processing device, an authoring method, and a program with which an ordinary user having no specialized knowledge can easily author AR content.

According to an embodiment of the present disclosure, there is provided an information processing device including an image acquisition unit configured to acquire an input image of a real space captured with an imaging device, a user interface unit configured to display the input image on a screen of a display device and detect a designated position designated by a user on the screen, a computation unit configured to compute a three-dimensional position of a virtual object in an augmented reality space from the designated position detected by the user interface unit, and an authoring unit configured to associate the three-dimensional position of the virtual object computed by the computation unit with the virtual object to store the three-dimensional position in a storage medium.

The user interface unit may prompt the user to designate one of faces of a real object included in the input image as a first face, and the three-dimensional position computed by the computation unit may be a position which is on a plane including the first face in the augmented reality space and is corresponding to the designated position.

The user interface unit may further prompt the user to designate a vector on the screen, the computation unit may further compute an attitude of the virtual object in the augmented reality space using the designated vector, and the authoring unit may further store the attitude of the virtual object computed by the computation unit in the storage medium.

The computation unit may compute the attitude of the virtual object in the augmented reality space so that a normal line of at least one face of the virtual object becomes parallel with a normal line of the first face when the virtual object is displayed.

The user interface unit may further prompt the user to designate a distance between the at least one face of the virtual object and the plane including the first face, and the computation unit may offset, when the distance is not zero, the three-dimensional position of the virtual object in accordance with the distance.

The user interface unit may detect two designated positions designated by the user on the screen, the computation unit may compute the three-dimensional position and an attitude of the virtual object in the augmented reality space so that faces of a real object included in the input image corresponding to the two respective designated positions are in contact with two faces of the virtual objects, and the authoring unit may store the three-dimensional position and the attitude of the virtual object computed by the computation unit in the storage medium.

The user interface unit may prompt the user to designate a real object in the real space associated with the virtual object, and the three-dimensional position may be stored as a relative position with respect to the real object designated by the user.

The information processing device may further include a data acquisition unit configured to acquire model data representing a feature of an appearance of each of one or more real objects in the real space, and a recognition unit configured to recognize a position and an attitude of each real object in the real space in the input image by checking the input image against the model data.

The computation unit may further compute a size of the virtual object in the augmented reality space when the virtual object is displayed, in accordance with a size of the first face in the real space.

According to another embodiment of the present disclosure, there is provided an authoring method including acquiring an input image of a real space captured with an imaging device, displaying the input image on a screen of a display device, detecting a designated position designated by a user on the screen, computing a three-dimensional position of a virtual object in an augmented reality space from the detected designated position, and associating the computed three-dimensional position of the virtual object with the virtual object to store the three-dimensional position in a storage medium.

According to still another embodiment of the present disclosure, there is provided a program for causing a computer that controls an information processing device connected to a display device to function as an image acquisition unit configured to acquire an input image of a real space captured with an imaging device, a user interface unit configured to display the input image on a screen of the display device and detect a designated position designated by a user on the screen, a computation unit configured to compute a three-dimensional position of a virtual object in an augmented reality space from the designated position detected by the user interface unit, and an authoring unit configured to associate the three-dimensional position of the virtual object computed by the computation unit with the virtual object to store the three-dimensional position in a storage medium.

As described above, the information processing device, the authoring method, and the program in accordance with the present disclosure allow an ordinary user having no specialized knowledge to easily author AR content.

BRIEF DESCRIPTION OF THE DRAWINGS

FIG. 12 is an explanatory diagram showing a data example of virtual object data;

FIG. 27 is an explanatory diagram showing an example of an image displayed in the fifth scenario; and FIG. 28 is an explanatory diagram illustrating a change in size of a virtual object.

DETAILED DESCRIPTION OF THE EMBODIMENTS

Figure 1:
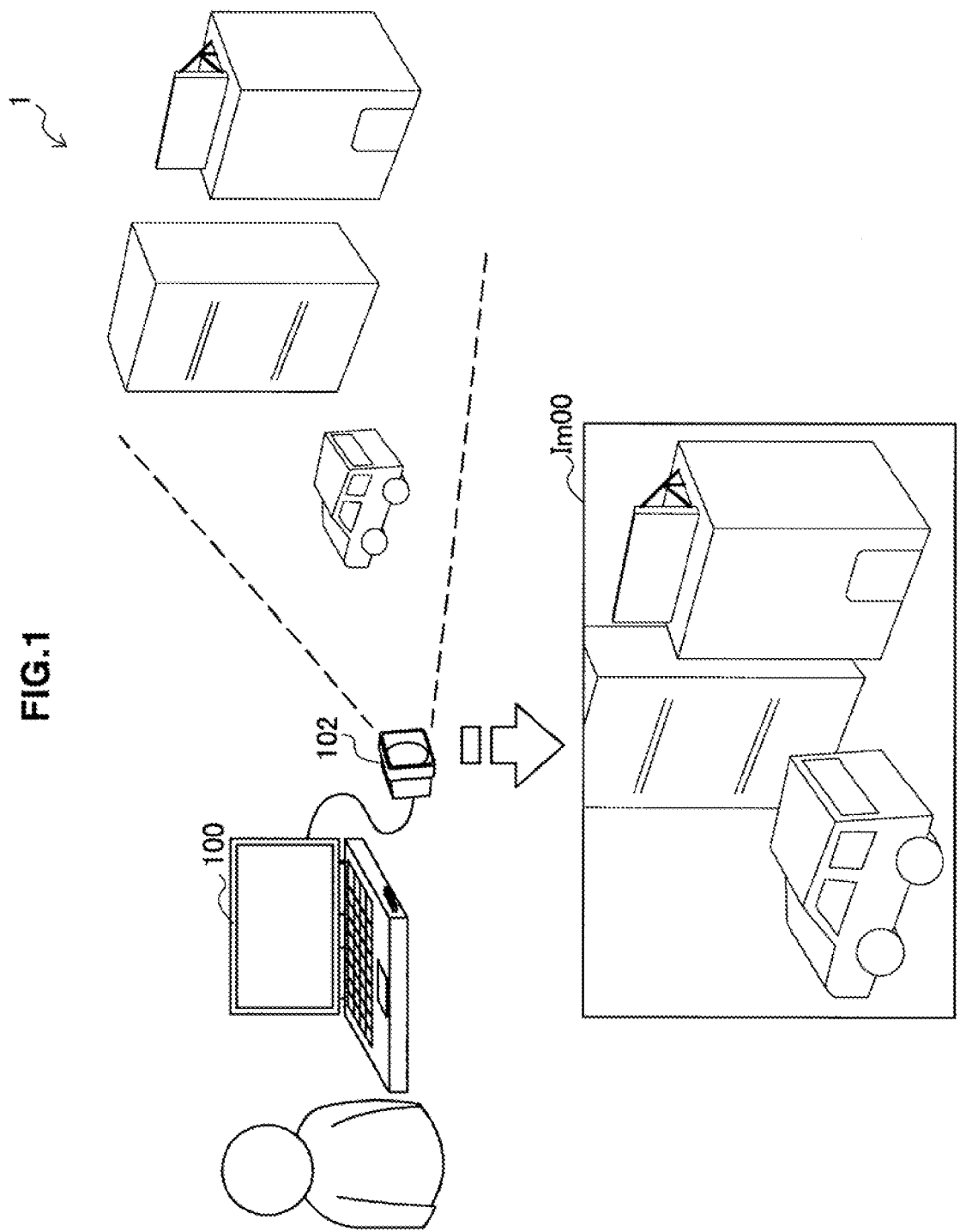
FIG. 1 is an explanatory diagram illustrating an overview of an information processing device in accordance with an embodiment.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

The "DETAILED DESCRIPTION OF THE EMBODIMENTS" will be described in the following order.

1. Overview of Information Processing Device in Accordance with Embodiment
2. Example of Hardware Configuration
3. Example of Data Structures
   3-1. Model Data
   3-2. Virtual Object Data
4. Example of Functional Configuration
   4-1. Image Acquisition Unit
   4-2. Data Acquisition Unit
   4-3. Image Recognition Unit.
   4-4. User Interface Unit
   4-5. Authoring Unit
   4-6. Computation Unit
5: Generation of Instance Data
6. Operation Scenario
7. Conclusion <1. Overview of Information Processing Device in Accordance with Embodiment>

First, an overview of an information processing device in accordance with an embodiment of the present disclosure will be described with reference to FIGS. 1 and 2. Referring to FIG. 1, an information processing device 100 is exemplarily shown. The information processing device 100 is a device used by a user who authors AR content. In FIG. 1, a PC (Personal Computer) is shown as an example of the information processing device 100. However, the information processing device 100 can be other types of device such as a smartphone, a PDA (Personal Digital Assistant), a game terminal, or a work station.

In the example of FIG. 1, the information processing device 100 is connected to an imaging device 102. The imaging device 102 captures an image of a real space 1 and generates a captured image. The captured image generated by the imaging device 102 becomes an input image to be processed by the information processing device 100 described below. In the lower part of FIG. 1, an input image Im00 is exemplarily shown. The input image can be input to the information processing device 100 in real time when authoring is performed. Alternatively, a captured image can be once stored in a storage medium that is accessible from the information processing device 100 so that authoring can be performed later using the stored captured image as an input image. As a further alternative, a captured image can be provided from a server on a network that is accessible from the information processing device 100. For example, the information processing device 100 can acquire a captured image from an image information providing service such as Google Earth™.

Figure 2:
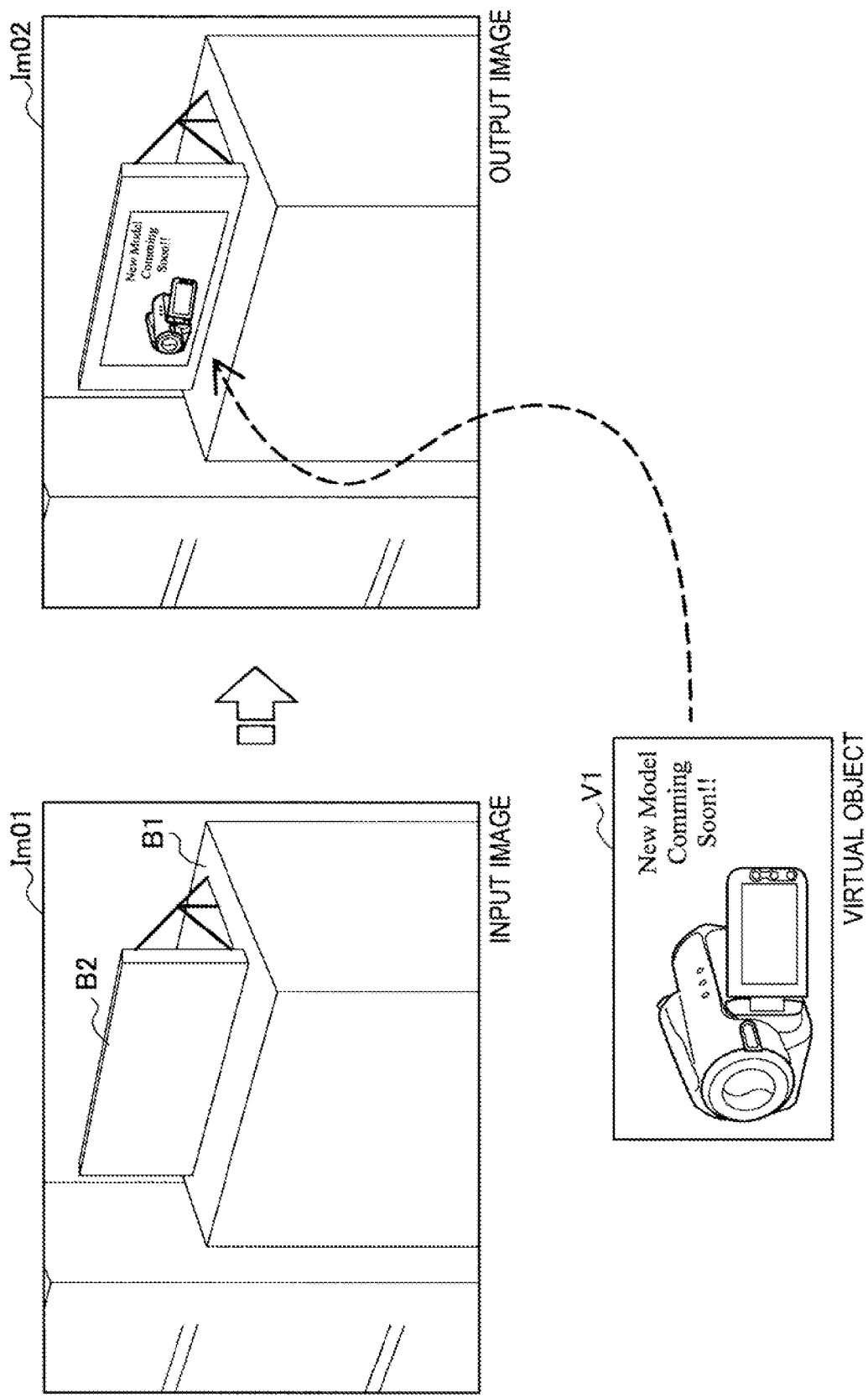
FIG. 2 is an explanatory diagram illustrating authoring of AR content.

FIG. 2 is an explanatory diagram illustrating authoring of AR content. The left part of FIG. 2 shows an input image Im01 that is obtained by partially enlarging the input image Im00 shown in FIG. 1. The input image Im01 includes real objects B1 and B2 existing in the real space. The real object B1 is a building. The real object B2 is a sign set on the roof of the building B1. In the real space, the sign B2 has nothing written on its surface.

The lower part of FIG. 2 shows a virtual object V1. The virtual object V1 is an annotation that mimics a poster for displaying an advertisement about a new model video camera. In the information processing device 100, one or more of such virtual objects is/are stored in advance. Then, a user arranges the virtual object(s) at a desired position(s) in the input image during the operation of authoring AR content.

The right part of FIG. 2 shows an output image Im02 in which the virtual object V1 is arranged. In the output image Im02, the virtual object V1 is overlaid on the surface of the sign B2. The output image Im02 is an image that can be checked by a developer user on the screen of the information processing device 100. The output image Im02 is also an image that can be presented to an end user who uses an AR application in the real space 1. In order that the virtual object V1 can be adequately overlaid on the surface of the sign B2 even when the end user changes the orientation of the terminal, the three-dimensional position (and the attitude) of the virtual object V1 in the AR space should be accurately defined.

In order to define the arrangement of a virtual object in the AR space, an operation that involves a high-level specialized knowledge has been required so far, such as computation of the three-dimensional coordinates of the virtual object and coordinate transformation between the three-dimensional coordinates and the two-dimensional coordinates, for example. Therefore, it has been only an expert with a specialized knowledge who is able to author AR content. In contrast, the information processing device 100 in accordance with this embodiment allows an ordinary user having no specialized knowledge to easily author AR content through a mechanism that is described in detail in the following section.

<2. Example of Hardware Configuration>

Figure 3:
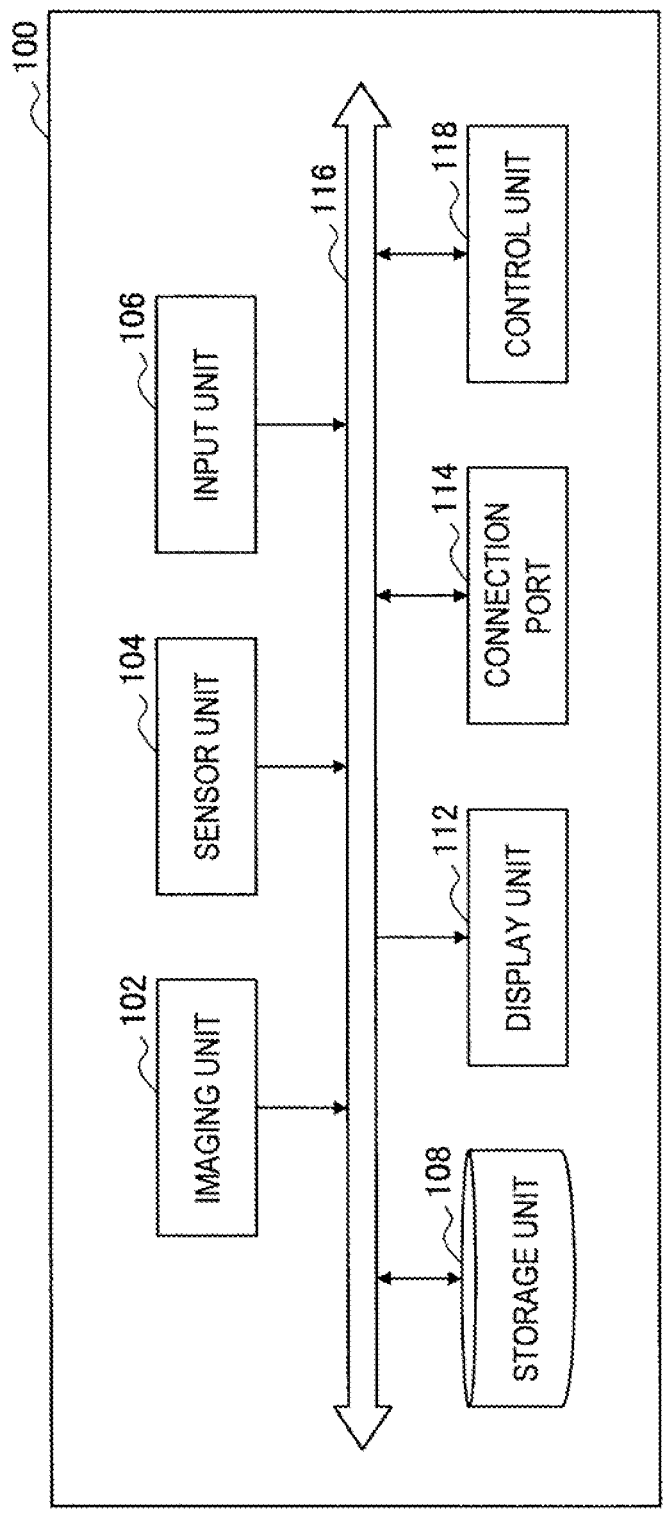
FIG. 3 is a block diagram showing an example of the hardware configuration of an information processing device in accordance with an embodiment.

FIG. 3 is a block diagram showing an example of the hardware configuration of the information processing device 100 in accordance with this embodiment. Referring to FIG. 3, the information processing device 100 includes an imaging unit 102, a sensor unit 104, an input unit 106, a storage unit 108, a display unit 112, a connection port 114, a bus 116, and a control unit 118.

(Imaging Unit)

The imaging unit 102 is a camera module corresponding to the imaging device 102 exemplarily shown in FIG. 1. The imaging unit 102 captures an image of the real space 1 using an image sensor such as a CCD (Charge Coupled Device) or a CMOS (Complementary Metal Oxide Semiconductor) to generate a captured image.

(Sensor Unit)

The sensor unit 104 is a sensor group that assists in the recognition of the position and the attitude of the information processing device 100 (the position and the attitude of the imaging unit 102). For example, the sensor unit 104 can include a GPS sensor that measures the latitude, the longitude, and the altitude of the information processing device 100 upon receiving a GPS (Global Positioning System) signal. In addition, the sensor unit 104 can include a positioning sensor that measures the position of the information processing device 100 on the basis of the intensity of a radio signal received from a wireless access point. Further, the sensor unit 104 can include a gyro sensor that measures the tilt angle of the information processing device 100, an accelerometer that measures the three-axis acceleration, or a geomagnetic sensor that measures the orientation. Note that when the information processing device 100 has a position estimation function and an attitude estimation function based on image recognition, the sensor unit 104 can be omitted from the configuration of the information processing device 100.

(Input Unit)

The input unit 106 is an input device used for a user to operate the information processing device 100 or to input information to the information processing device 100. The input device 106 can include a keyboard, a keypad, a to mouse, a button, a switch, a touch panel, or the like, for example. The input unit 106 can also include a gesture recognition module that recognizes a gesture of a user in an input image. Further, the input unit 106 can also include a line-of-sight detection module that detects as a user input the direction of the line of sight of a user wearing an HMD (Head Mounted Display).

(Storage Unit)

The storage unit 108 stores programs and data for processes performed by the information processing device 100, using a storage medium such as semiconductor memory or a hard disk. For example, the storage unit 108 temporarily stores image data output from the imaging unit 102 and sensor data output from the sensor unit 104. In addition, the storage unit 108 also stores model data and virtual object data used for authoring. Further, the storage unit 108 also stores instance data generated as a result of authoring.

(Display Unit)

The display unit 112 is a display module including an LCD (Liquid Crystal Display), an OLED (Organic Light-Emitting Diode), or a CRT (Cathode Ray Tube). On the screen of the display unit 112, a user interface for authoring AR content provided by the information processing device 100 is displayed. The display unit 112 can be a part of the information processing device 100 or be configured as a separate component of the information processing device 100. Alternatively, the display unit 112 can be an HMD worn by a user.

(Connection Port)

The connection port 114 is a port for connecting the information processing device 100 to a peripheral device or a network. For example, a removable medium as an additional storage medium can be connected to the connection port 114. Alternatively, a wired or wireless communication interface can be connected to the connection port 114. Accordingly, it becomes possible for the information processing device 100 to acquire an image from a server on the network.

(Bus)

The bus 116 mutually connects the imaging unit 102, the sensor unit 104, the input unit 106, the storage unit 108, the display unit 112, the connection port 114, and the control unit 118.

(Control Unit)

The control unit 118 corresponds to a processor such as a CPU (Central Processing Unit) or a DSP (Digital Signal Processor). The control unit 118 causes a variety of functions of the information processing device 100 described below to operate by executing the programs stored in the storage unit 108 or another storage medium.

<3. Example of Data Structures>

Next, model data and virtual object data used by the information processing device 100 in this embodiment will be described with reference to FIGS. 4 to 12.

[3-1. Model Data]

Model data is data representing the feature of the appearance of each of one or more real objects in the real space. The model data is used to recognize a real object in the input image. In addition, the position and the attitude of a real object in the input image, or the position and the attitude of the imaging device (or the information processing device 100) can also be recognized using model data. The types of model data can be further divided into two. The model data of the first type is a real space model including positional data that represents the position of each real object in addition to the data representing the appearance of each real object. That is, a real space model corresponds to a map of a modeled real space. The model data of the second type is an object model representing the feature of the appearance of a real object that is not associated with its position. The information processing device 100 uses at least one of the real space model or the object model.

(1) Real Space Model

Figures 4, 5:
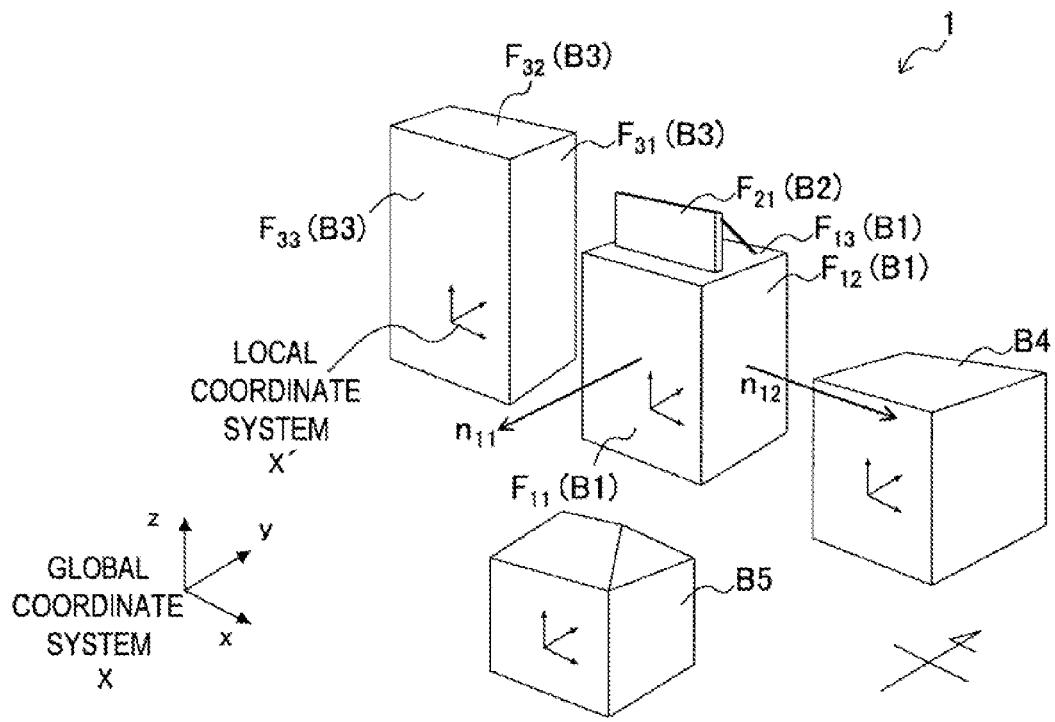
FIG. 4 is an explanatory diagram illustrating an overview of a real space model.
FIG. 5 is an explanatory diagram showing a data example of a real space model.

FIG. 4 is an explanatory diagram illustrating an overview of a real space model. Referring to FIG. 4, five real objects B1 to B5 in the real space 1 are shown. The real objects B1, B3, B4, and B5 are (models of) buildings existing in the real space 1. The real object B2 is (a model of) a sign existing in the real space 1. Each real object is located at a specific position that can be represented by the global coordinate system X (x,y,z) in the real space 1.

Each real object is represented as a set of polygons (faces of polygons). For example, the real object B1 has faces $F_{11}$, $F_{12}$, and $F_{13}$ as well as other faces that are not shown. The real object B2 has a face $F_{21}$ as well as other faces that are not shown. The real object B3 has faces $F_{31}$, $F_{32}$, and $F_{33}$ as well as other faces that are not shown. The coordinates of the vertices of such faces can be represented by the local coordinate system X' set on each real object. In addition, each face has a normal line extending therefrom to the outer side of the real object to which the face belongs. For example, a normal line $n_{11}$ is a normal line of the face $F_{11}$, and a normal line $n_{12}$ is a normal line of the face $F_{12}$.

FIG. 5 is an explanatory diagram showing a specific data example of the real space model. Referring to FIG. 5, a real space model MD1 is partially shown as an example. The real space model MD1 has seven data items: "object ID," "description," "position," "attitude," "face," "normal line," and "vertex." The "object ID" is an identifier for uniquely identifying each real object included in the real space model MD1. The "description" is a character string showing the description about the real object. The "position" represents the position coordinates of each real object on the global coordinate system, and typically corresponds to the position of the origin of each real object on the local coordinate system. The "attitude" is a rotation matrix, which represents a rotation of the local coordinate system of each real object with reference to the global coordinate system, or a quaternion. The "face" is an identifier for uniquely identifying a face of each real object. Each real object has one or more faces. The "normal line" is a normal vector of each face. The "vertices" are the position coordinates of the vertices of each face on the local coordinate system. Each face has three or more vertices.

(2) Object Model

Figures 6, 7:
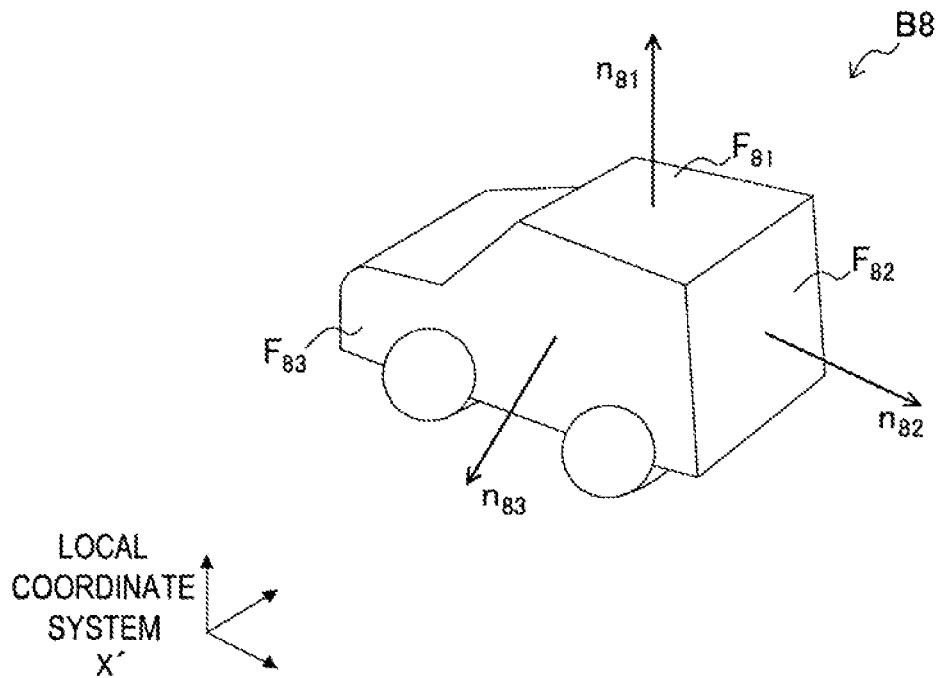
FIG. 6 is an explanatory diagram illustrating an overview of an object model.
FIG. 7 is an explanatory diagram showing a data example of an object model.

FIG. 6 is an explanatory diagram illustrating an overview of an object model. Referring to FIG. 6, a real object B8 that can exist in the real space 1 is shown. For example, the real object B8 is (a model of) an automobile. The real object B8 has a specific local coordinate system, and the appearance of the real object B8 is defined as a set of polygons using the local coordinate system. For example, the real object B8 has faces $F_{81}$, $F_{82}$, and $F_{83}$ as well as other faces that are not shown. The coordinates of the vertices of each face are represented by the local coordinate system X'. In addition, each face has a normal line extending therefrom to the outer side of the real object to which the face belongs. For example, a normal line $n_{81}$ is a normal line of the face $F_{81}$, a normal line $n_{82}$ is a normal line of the face $F_{82}$, and a normal line $n_{83}$ is a normal line of the face $F_{83}$.

Each real object represented by the object model is not associated with a specific position on the global coordinate system of the real space. Thus, the object model is suitable for defining a dynamic real object that can move within the real space. Meanwhile, the real space model is suitable for defining a static real object whose position is fixed in the real space.

FIG. 7 is an explanatory diagram showing a specific data example of the object model. In the example of FIG. 7, an object model MD2 including data about the real object B8 and the real object B9 is partially shown. The object model MD2 has five data items: "object ID," "description," "face," "normal line," and "vertices." The "object ID" is an identifier for uniquely identifying each real object included in the object model MD2. The "description" is a character string showing the description about the real object. The "face" is an identifier for uniquely identifying a face of each real object. Each real object has one or more faces. The "normal line" is a normal vector of each face. The "vertices" are the position coordinates of the vertices of each face on the local coordinate system. Each face has three or more vertices.

Such real space model and object model are typically created in advance and stored in the storage unit 108 or another storage medium. Alternatively, the real space model and the object model can be created interactively or dynamically in the information processing device 100 in accordance with a method described in Reference 1 above, for example. Further, in the real space model and the object model, a flag for identifying a face that can be used as a contacted face (described later) can be set as the attributes of each face.

[3-2. Virtual Object Data]

Virtual object data is data representing the feature of the shape of a virtual object and the attributes of the component of the virtual object. FIGS. 8 to 11 show four examples of virtual objects.

Figure 8:
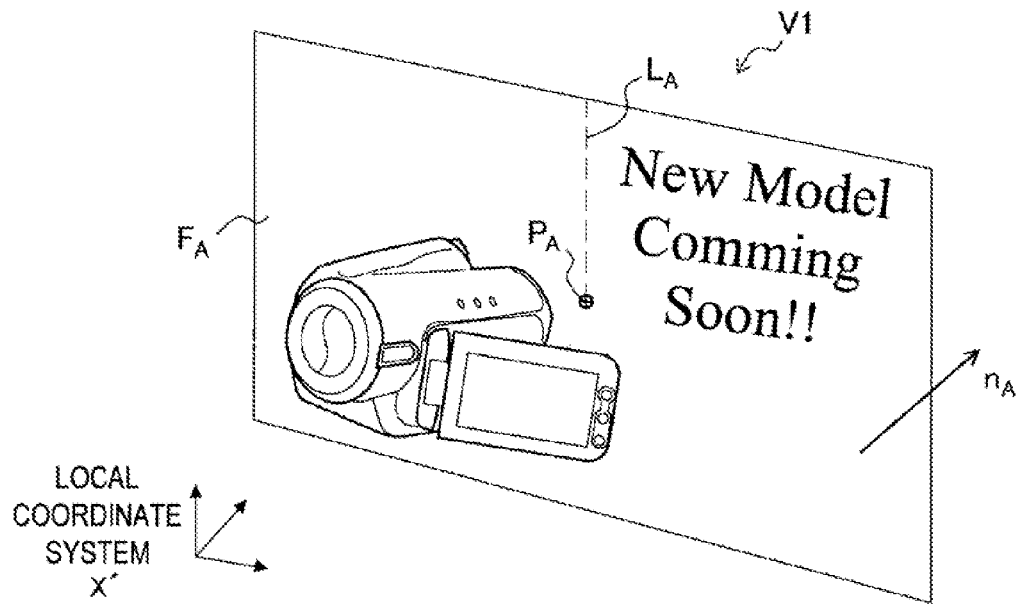
FIG. 8 is an explanatory diagram showing a first example of a virtual object.

FIG. 8 shows a virtual object V1 as a first example. The virtual object V1 is an annotation that mimics a poster for displaying an advertisement. The virtual object V1 is a planar object, and is represented as a single polygon with a texture image added thereto. The virtual object V1 has a face $F_A$. The coordinates of the vertices of the face $F_A$ can be represented by the local coordinate system X' set on the virtual object V1. The normal line $n_A$ is a normal line of the face $F_A$.

In this embodiment, a reference point and a reference line, which serve as a reference in computation of the arrangement of the virtual object, are set on at least one face of the virtual object. In the example of FIG. 8, a reference point $P_A$ and a reference line $L_A$ are set on the face $F_A$ of the virtual object V1. The reference point can be the center of gravity of a face to which the reference point belongs or be any of the vertices. Alternatively, the reference point can be a point at a given position designated by a user in advance. The reference line is typically a line segment that starts from the reference point.

Figure 9:
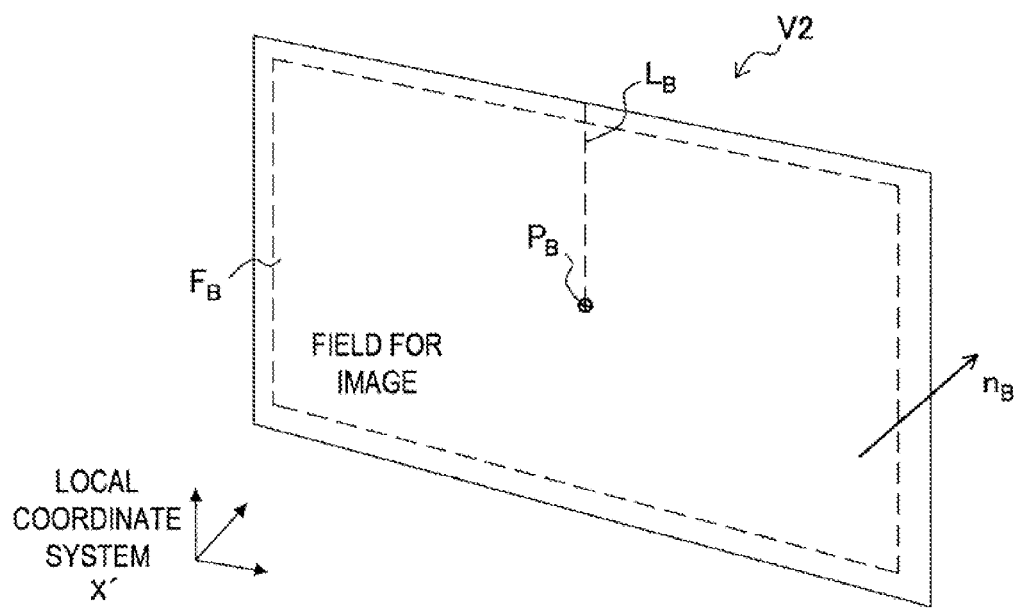
FIG. 9 is an explanatory diagram showing a second example of a virtual object.

FIG. 9 shows a virtual object V2 as a second example. The virtual object V2 is an object corresponding to a container having a field (a dotted frame in the drawing) for displaying a given image. For example, when an image for navigation is set in the field, the virtual object V2 can be an annotation for navigation. The virtual object V2 is also a planar object, and is represented as a single polygon. The virtual object V2 has a face $F_B$. The coordinates of the vertices of the face $F_B$ can be represented by the local coordinate system X' set on the virtual object V2. A normal line $n_B$ is a normal line of the face $F_B$. In the example of FIG. 9, a reference point $P_B$ and a reference line $L_B$ are set on the face $F_B$ of the virtual object V2.

Figure 10:
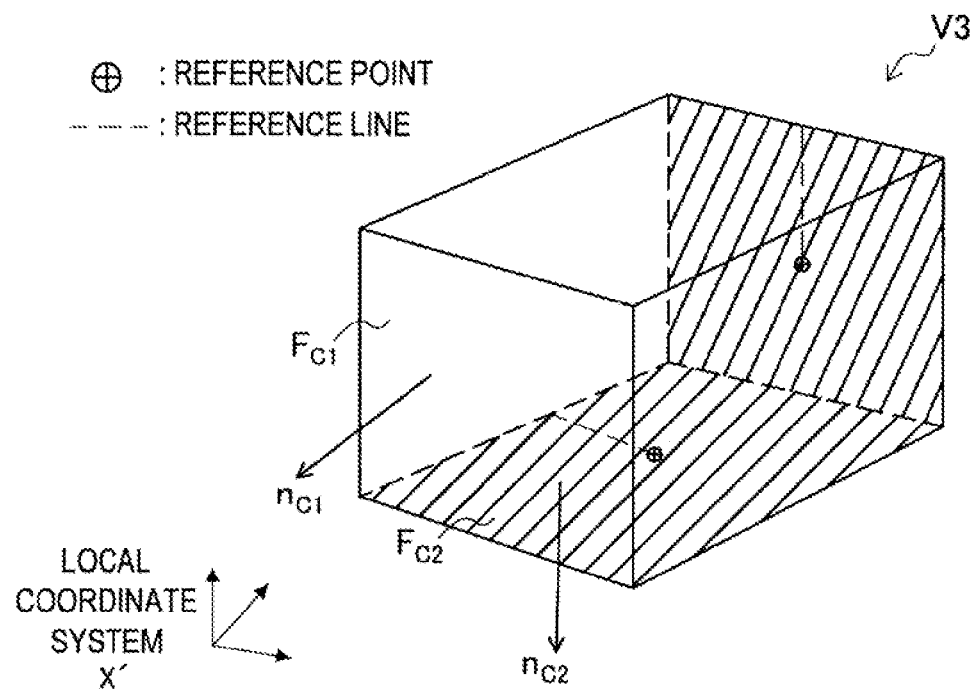
FIG. 10 is an explanatory diagram showing a third example of a virtual object.

FIG. 10 shows a virtual object V3 as a third example. The virtual object V3 is a stereoscopic object, and is represented as a set of polygons. For example, the virtual object V3 has faces $F_{C1}$ and $F_{C2}$ as well as other faces. The coordinates of the vertices of each face can be represented by the local coordinate system X' set on the virtual object V3. A normal line $n_{C1}$ is a normal line of the face $F_{C1}$. A normal line $n_{C2}$ is a normal line of the face $F_{C2}$. At least one face of a stereoscopic virtual object is defined as a contact face that is contact with or opposite to a real object of the real space in the AR space. For example, when a virtual object is a stereoscopic virtual object that mimics a standing human, a bottom face corresponding to the shoe sole of the virtual object is defined as a contact face. In the example of FIG. 10, two hatched faces of the virtual object V3 are contact faces. A reference point and a reference line are set on each contact face.

Figure 11:
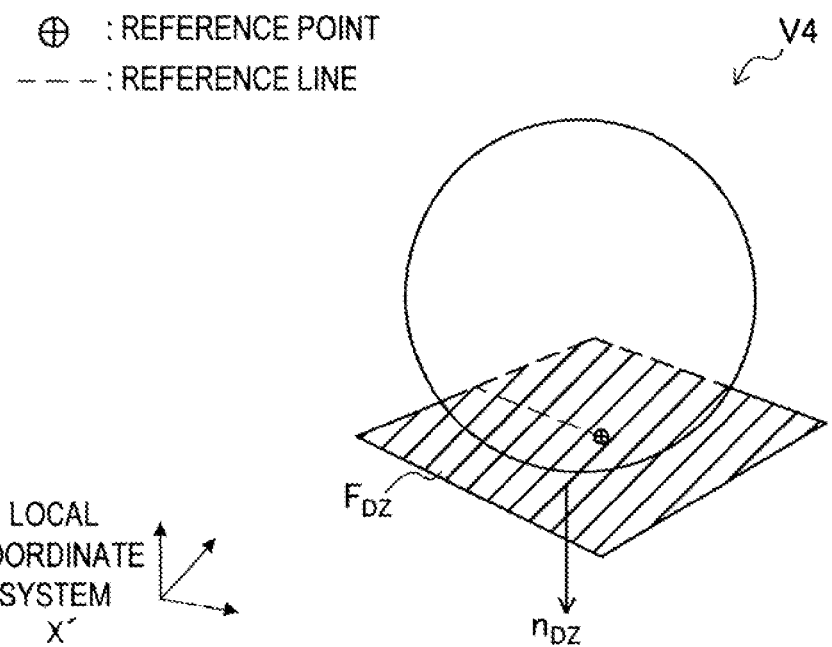
FIG. 11 is an explanatory diagram showing a fourth example of a virtual object.

FIG. 11 shows a virtual object V4 as a fourth example. The virtual object V4 is a stereoscopic object that is approximately spherical in shape. The approximately spherical shape of the virtual object V4 can also be represented as a set of polygons as an approximate polyhedron. However, for such a virtual object, it is difficult to set a contact face on the surface of the object. Thus, an auxiliary face $F_{DZ}$ to be used as a contact face is added to the virtual object V4. A normal line $n_{DZ}$ is a normal line of the face $F_{DZ}$. The face $F_{DZ}$ is a transparent face, and is not displayed for an end user. A reference point and a reference line are set on the contact face $F_{DZ}$.

FIG. 12 is an explanatory diagram showing a specific data example of the virtual object data. In FIG. 12, virtual object data VD including data about the virtual objects V1, V2, V3, and V4 are partially shown. The virtual object data VD includes ten data items: "ID," "description," "type," "face," "transparent flag," "contact flag," "reference point," "reference line," "normal line," and "vertices." The "ID" is an identifier for uniquely identifying each virtual object. The "description" is a character string showing the description about the virtual object. The "type" represents a flag indicating if the virtual object is a planar object or a stereoscopic object. The "face" is an identifier for uniquely identifying a face of the virtual object. Each virtual object has one or more faces. The "transparent flag" is a flag indicating if each face is a transparent face or not. The "contact flag" is a flag indicating if each face is a contact face or not. For a planar virtual object, the "contact flag" can be omitted (as a single face is a contact face). The "reference point" is the position coordinates of a reference point set on each contact face on the local coordinate system. The "reference line" is data representing a reference line set on each contact face (e.g., a unit vector along the reference line or the position coordinates of an end point on the opposite side of the reference point). The "normal line" is a normal vector of each face. The "vertices" are the position coordinates of the vertices of each face on the local coordinate system. Each face has three or more vertices.

Such virtual object data can be created in advance and stored in the storage unit 108 or another storage medium.

<4. Example of Functional Configuration>

Figure 13:
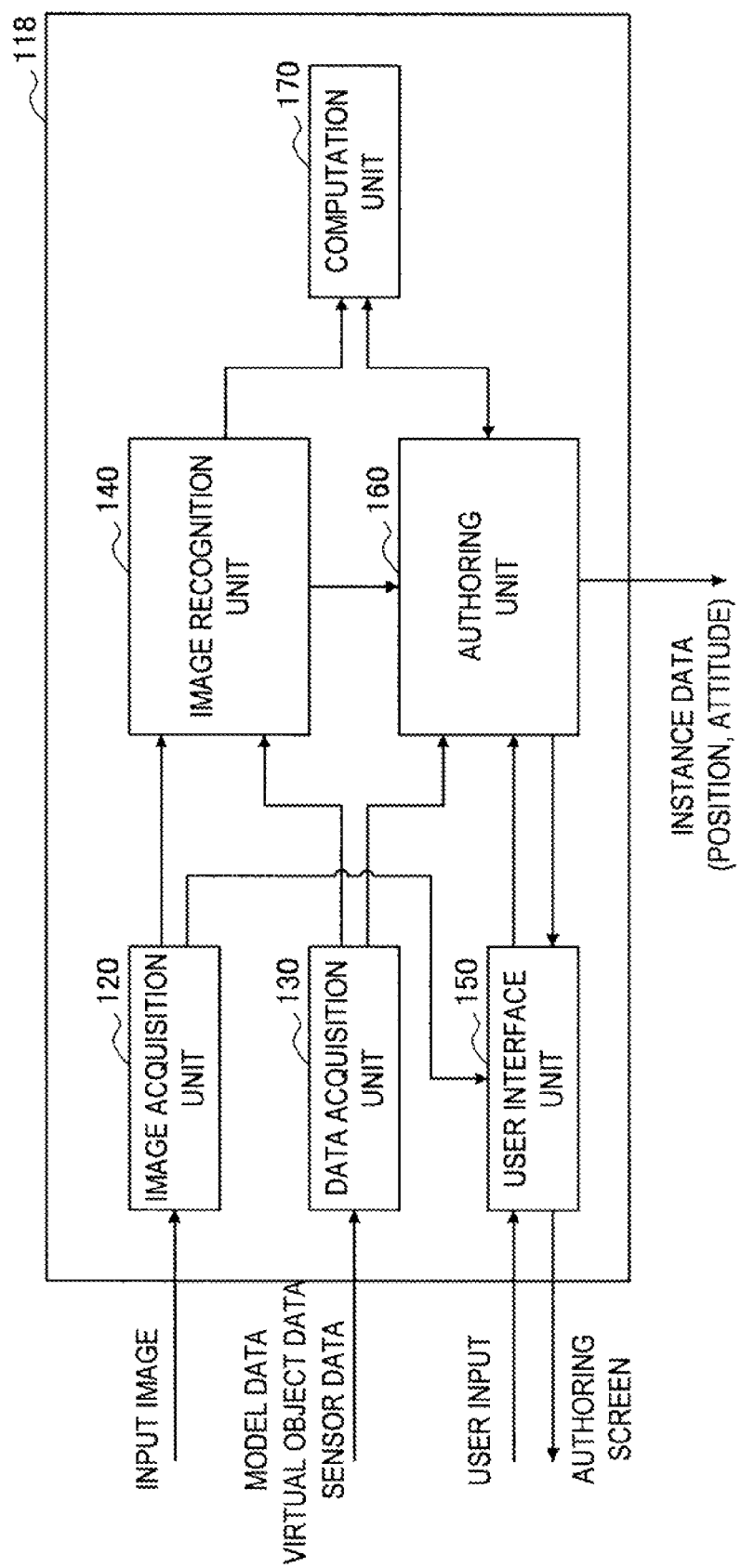
FIG. 13 is a block diagram showing an example of a functional configuration of an information processing device in accordance with an embodiment.

FIG. 13 is a block diagram showing an example of the configuration of a function implemented by the control unit 118 of the information processing device 100 shown in FIG. 3. Referring to FIG. 13, the control unit 118 includes an image to acquisition unit 120, a data acquisition unit 130, an image recognition unit 140, a user interface unit 150, an authoring unit 160, and a computation unit 170.

[4-1. Image Acquisition Unit]

The image acquisition unit 120 acquires an input image of a real space that has been captured with the imaging unit 102 (or another imaging device). The input image is an image of a place or a real object in the real space on which a virtual object is to be arranged. The image acquisition unit 120 outputs the acquired input image to the image recognition unit 140 and the user interface unit 150.

[4-2. Data Acquisition Unit]

The data acquisition unit 130 acquires data to be used for authoring in the information processing device 100. The data acquired by the data acquisition unit 130 includes the aforementioned model data (one or both of the real space model and the object model) and the virtual object data. The data acquisition unit 130 outputs the model data to the image recognition unit 140. In addition, the data acquisition unit 130 outputs the virtual object data to the authoring unit 160. Further, sensor data measured by the sensor unit 104 is also acquired by the data acquisition unit 130.

[4-3. Image Recognition Unit]

The image recognition unit 140 checks the input image against the model data input from the data acquisition unit 130 to recognize the real object in the input image. More specifically, for example, the image recognition unit 140 extracts feature points in the input image in accordance with any known method such as FAST feature detection. Then, the image recognition unit 140 checks the extracted feature points against the vertices of the real object included in the model data. Consequently, the image recognition unit 140 recognizes which real objects are included in the input image and at which position and in what attitude each of the recognized real object is. When the recognized real object is a real object included in the real space model, the three-dimensional position and the attitude of the real object are shown in the real space model. When the recognized real object is a real object included in the object model, the three-dimensional position and the attitude of the real object can be determined by transforming the two-dimensional position of the vertices of the real object on the imaging plane into a three-dimensional position in the real space in accordance with a pinhole model (for example, see JP 2008-304268A).

Further, the image recognition unit 140 recognizes the position and the attitude of the information processing device 100. For example, the image recognition unit 140 can, when a real object in the input image has a natural marker, recognize the position and the attitude of the information processing device 100 using the natural marker in the input image in accordance with a method described in Reference 2 above. Alternatively, the image recognition unit 140 can dynamically estimate the position and the attitude of the information processing device 100 using the input image in accordance with the principle of SLAM (Simultaneous Localization and Mapping) technology (see "Real-Time Simultaneous Localization and Mapping with a Single Camera" (Proceedings of the 9th IEEE International Conference on Computer Vision Volume 2, 2003, pp. 1403-1410) by J. Davison).

Note that the position and the attitude of the information processing device 100 can also be recognized using sensor data (e.g., positional data from a GPS sensor) acquired from the sensor unit 104 instead of image recognition. In addition, the absolute position and the attitude of each real object can be computed on the basis of the relative position and the attitude of each real object recognized as a result of image recognition and the absolute position and the attitude of the information processing device 100 recognized by using the sensor data.

[4-4. User Interface Unit]

The user interface unit 150 provides a user interface for authoring to a user under the control of the authoring unit 160 described below. A user interface provided by the user interface unit 150 is typically a GUI (Graphical User Interface) implemented by using the input unit 106 and the display unit 112. More specifically, the user interface unit 150 displays an authoring screen for displaying an input image input from the image acquisition unit 120 using the display unit 112.

Figure 14:
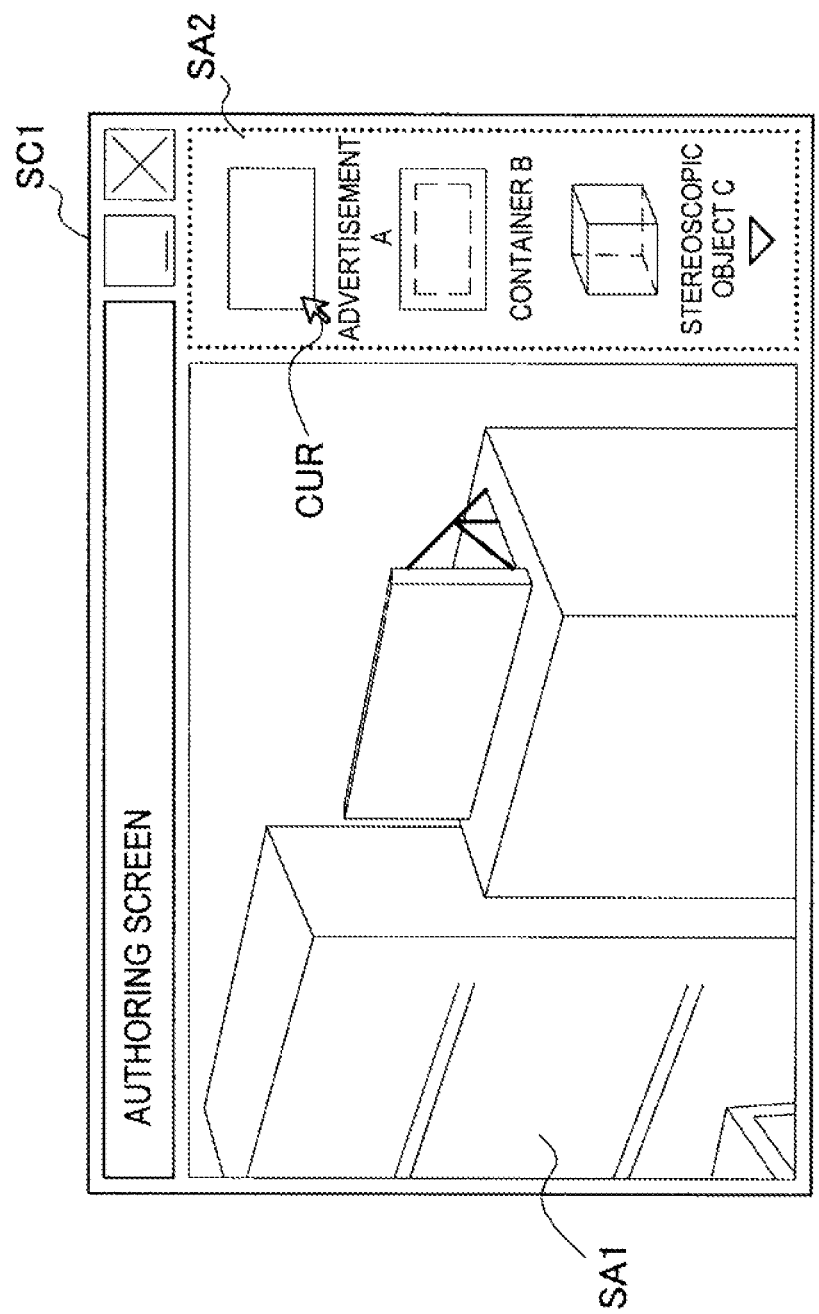
FIG. 14 is an explanatory diagram showing an example of an authoring screen in accordance with an embodiment.

FIG. 14 is an explanatory diagram showing an example of an authoring screen that can be displayed in accordance with this embodiment. Referring to FIG. 14, an authoring screen SC1 is exemplarily shown. The authoring screen SC1 has an input image area SA1 and a virtual object list area SA2. In the input image area SA1, an input image input from the image acquisition unit 120 is displayed. In the virtual object list area SA2, a list of candidates for virtual objects to be arranged in the AR space is displayed. A user selects a virtual object to be arranged in the AR space from among the candidates displayed in the virtual object list area SA2, using a cursor CUR. Then, the user arranges the selected virtual object in the AR space on the input image area SA1. The user interface unit 150 detects several parameters for computing the three-dimensional position and the attitude of the virtual object in the AR space in accordance with an operation performed on the input image area SA1. Typical scenarios of an authoring operation performed via such a user interface are specifically described below.

[4-5. Authoring Unit]

The authoring unit 160 controls authoring of AR content performed via a user interface provided by the user interface unit 150. The authoring unit 160 acquires from the image recognition unit 140 the three-dimensional position and the attitude of a real object in the input image as well as the position and the attitude of the information processing device 100. In addition, the authoring unit 160 acquires from the data acquisition unit 130 virtual object data exemplarily shown in FIG. 12. Then, the authoring unit 160 causes the user interface unit 150 to display the aforementioned authoring screen. After that, the authoring unit 160 causes the computation unit 170 to compute the three-dimensional position and the attitude of the virtual object in the AR space on the basis of parameters designated on the authoring screen. Then, the authoring unit 160 causes the storage unit 108 or another storage medium to store the computed three-dimensional position and attitude of the virtual object.

Note that each virtual object defined by the virtual object data can be arranged at a plurality of positions in the AR space. In this specification, such individual virtual objects that are actually arranged will be referred to as instances (of the virtual object). That is, virtual objects V1 that are arranged at two different places are the same virtual objects but are different instances.

[4-6. Computation Unit]

The computation unit 170 performs a computation process for determining the three-dimensional position and the attitude of an instance of a virtual object using parameters designated on the authoring screen under the control of the authoring unit 160.

(1) Principle of Computation Process

The relationship between the global coordinate system X of the real space (which is also the coordinate system of the AR space) and the local coordinate system X' of a single virtual object can be represented by the following relational expression (1).

Formula 1

$$X' = R_0 \cdot (X - C_0) \quad (1)$$

Herein, $C_0$ is the position coordinates representing the position of the origin of the local coordinate system in the global coordinate system. $R_0$ is a rotation matrix representing the attitude transformation of the local coordinate system with respect to the global coordinate system. As represented by Formula (1), the coordinates (the local coordinate system) of each vertex included in the virtual object data can be transformed into a coordinate position (global coordinates) in the real space in accordance with Formula (1) as long as the origin position $C_0$ of the local coordinate system and the attitude transformation $R_0$ can be obtained.

In this embodiment, the computation unit 170 computes the origin position $C_0$ and the attitude transformation $R_0$ in accordance with the following principle.

First, it is presumed that an instance of a virtual object is arranged such that it has the same tilt as a contacted face of a real object in the input image (that is, the two normal lines are parallel with each other). The contacted face is identified in accordance with a user input. Note that in the following description, a real object having a contacted face will be referred to as a contacted-face real object.

Provided that a normal vector of the identified contacted face on the global coordinate system is n and a normal vector of the contact face of the instance of the virtual object on the local coordinate system is n', Formula (2) is established.

[Formula 2]

$$n' = R_0 \cdot (-n) \quad (2)$$

In addition, provided that a vector representing the direction of a reference line of the instance on the local coordinate system is a' and a vector that points the same direction as the reference line of the instance on the global coordinate system (hereinafter referred to as a "reference line arrangement vector") is a, Formula (3) is established.

[Formula 3]

$$a' = R_0 \cdot a \quad (3)$$

The vector a' can be obtained from data of a reference line set in the virtual object data. The reference line arrangement vector a can be identified in accordance with a user input. Note that each of the four vectors n, n', a, and a' is a unit vector. Further, the four vectors n, n', a, and a' satisfy the following relational expression (4).

[Formula 4]

$$(n' \times a') = R_0 \cdot (-n \times a) \quad (4)$$

By solving Formulae (2) to (4), the attitude transformation $R_0$ of the local coordinate system can be obtained. Note that the attitude transformation of the local coordinate system can be represented by not a rotation matrix but a quaternion. In such a case, a quaternion representing the attitude transformation of the local coordinate system can be derived as long as the aforementioned vectors n, n', a, and a' can be identified.

Further, provided that the three-dimensional position at which the reference point of the instance is arranged on the global coordinate system (hereinafter referred to as a contact position) is Y and the three-dimensional position of the reference point on the local coordinate system is Y', Formula (5) is established.

[Formula 5]

$$C_0 = Y - R_0^T \cdot Y' \quad (5)$$

The position Y' of the reference point of the instance on the local coordinate system is set in advance in the virtual object data. Accordingly, the position $C_0$ of the origin of the local coordinate system on the global coordinate system can be computed as long as the contact position Y is identified.

In the principle of such computation process, variables that are not known in advance are three: ID of the contacted face, the contact position Y, and the reference line arrangement vector a.

(2) Identification of Contacted Face

The ID of the contacted face can be identified upon designation by a user of a contacted face in the input image area SA1 on the authoring screen SC1 exemplarily shown in FIG. 14 (through an operation such as a click or a tap). Note that the authoring unit 160 also knows the positions of faces hidden behind other faces in the input image as a result of image recognition performed by the image recognition unit 140. Thus, the authoring unit 160 can cause faces located behind other faces in the input image area SA1 to be displayed transparently or by a method of frame emphasis display so that the rear faces can also be designated by the user.

(3) Identification of Contact Position

The contact position Y can also be identified upon designation by a user of a place at which a reference point is to be arranged in the input image area SA1. A contacted face and a contact position can also be designated concurrently through a single user input.

For example, a position designated in the input image area SA1 is referred to as a designated position U. The designated position U is represented by a two-dimensional position (u,v) on the camera coordinate system on the imaging plane. Then, the following relational expression in accordance with a pinhole model is established between the designated position U (u,v) and the contact position Y corresponding to the designated position U.

[Formula 6]

$$\lambda[\mu,\nu,1]^T = A \cdot R_C \cdot (Y - X_C) \quad (6)$$

In Formula (6), $X_C$ represents the three-dimensional position of a camera, $R_C$ represents a rotation matrix corresponding to the attitude of the camera, matrix A represents a camera internal parameter, and $\lambda$ represents a parameter for normalization. The camera internal parameter A is given by the following formula in accordance with the characteristics of the imaging unit 102.

[Formula 7]

$$A = \begin{pmatrix} -f \cdot k_u & f \cdot k_u \cdot \cot\theta & u_o \\ 0 & -\dfrac{f \cdot k_v}{\sin\theta} & v_o \\ 0 & 0 & 1 \end{pmatrix} \quad (7)$$

Herein, f represents the focal length, $\theta$ represents the orthogonality of the image axis (the ideal value is 90°), $k_u$ represents the scale of the longitudinal axis of the imaging plane (the rate of change in scale from the global coordinate system to the camera coordinate system), $k_v$ represents the scale of the horizontal axis of the imaging plane, and $(u_o, v_o)$ represents the center position of the imaging plane.

In the relational expression (6), if the designated position U (u,v) is given, an unknown variable will be only the contact position Y. Thus, the computation unit 170 can compute the contact position Y through reverse projection transformation on the basis of the relational expression (6) (For details, see JP 2008-304268A).

Note that the contact position Y can also be computed as a preset value instead of being designated by a user. For example, the computation unit 170 can automatically compute the three-dimensional position of the center of gravity of the contacted face as a preset value of the contact position Y.

(4) Identification of Reference Line Arrangement Vector

The reference line arrangement vector a is identified upon designation by a user of two points (the start point and the end point of a vector) in the input image area SA1. The contact position Y and the start point of the reference line arrangement vector a can also be designated concurrently through a single user input. The computation unit 170 can calculate the three-dimensional positions of the start point and the end point of the reference line arrangement vector a on the global coordinate system from the two two-dimensional positions designated by the user, using a method similar to the aforementioned method of computing the contact position Y.

Note that the reference line arrangement vector a can also be computed as a preset value instead of being designated by a user. For example, the computation unit 170 can, when the contacted face is rectangular, automatically compute a unit vector along the long-side direction of the contacted face as a present value of the reference line arrangement vector a.

Alternatively, the computation unit 170 can automatically compute a preset value of the reference line arrangement vector a in accordance with a preset rule. For example, the reference line arrangement vector a can be a vector whose vertical components (e.g., Z-axis components of the global coordinate system) is the maximum in the AR space among unit vectors that start from the contact position and are included in the contacted face. Further, if a reference line of a virtual object is set in advance in the upper direction of the display, the attitude of the virtual object can be automatically set to an adequate attitude (an attitude in which the upper part is located above and the lower part is located below).

(5) Identification of Additional Parameters

In this embodiment, the authoring unit 160 allows a user to designate additional parameters described below in order to allow more flexible arrangement of a virtual object in the AR space.

One of additional parameters is an offset from the contact position. A preset value of an offset is zero, and in that case, the position of the reference point of the instance in the AR space coincides with the contact position (the contact face of the instance is in contact with the contacted face of the contacted real object). When the value of an offset is D (D≠0), the position of the reference point of the instance is offset from the contact position in the normal direction of the contacted face by the distance D (the contact face of the instance becomes parallel with the contacted face of the contacted real object).

Figure 15:
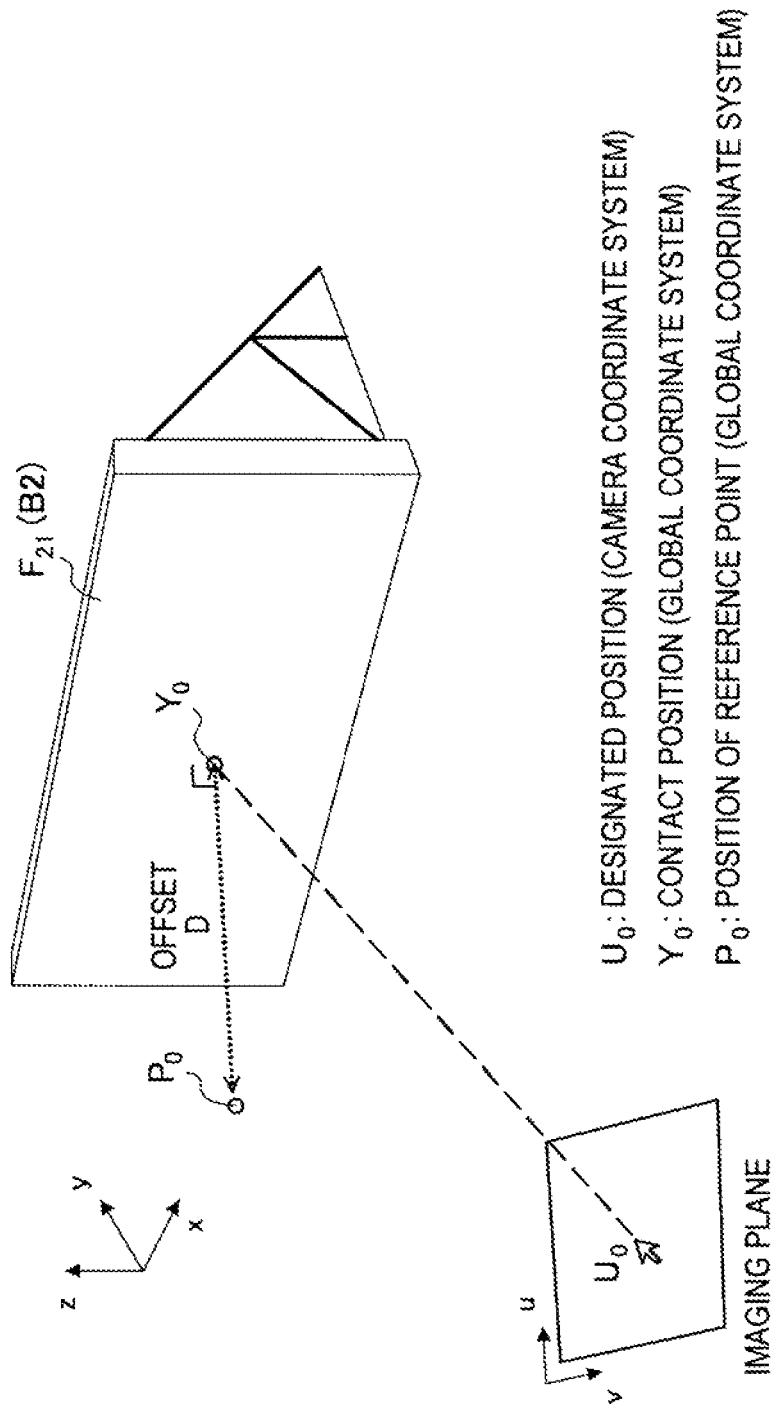
FIG. 15 is an explanatory diagram illustrating an offset from a contact position.

FIG. 15 is an explanatory diagram illustrating an offset from the contact position. Referring to FIG. 15, the designated position $U_0$ on the camera coordinate system on the imaging plane, the contact position $Y_0$ on the global coordinate system in the AR space, and the position $P_0$ of the reference point that is offset are shown. The contact position $Y_0$ is located on the contacted face $F_{21}$ of the contacted real object $B_2$. The designated position $U_0$ is designated by a user on the authoring screen. The contact position $Y_0$ can be computed from the two-dimensional coordinates of the designated position $U_0$ by the computation unit 170 in accordance with the aforementioned pinhole model. Further, when the user designates the offset D (D≠0), the computation unit 170 computes the position $P_0$ of the reference point that is away from the contact position $Y_0$ the distance D. A line segment that connects the contact position $Y_0$ and the position $P_0$ of the reference point is perpendicular with respect to the contacted face $F_{21}$.

Another additional parameter is the ID of a second contacted face. The ID of the second contacted face is identified upon designation by a user of a second contacted face in the input image area SA1 on the authoring screen SC1 exemplarily shown in FIG. 14. Designation of the second contacted face is permitted when a selected virtual object is a stereoscopic object having two or more contact faces. When two contacted faces are designated, an instance of the virtual object is arranged so that two faces of the instance are in contact with the two respective contacted faces.

Further, when a selected virtual object has three or more contact faces, three contacted faces can be designated by a user. When three contacted faces are designated, an instance of the virtual object is arranged so that three faces of the instance are in contact with the three respective contacted faces.

(5) Flow of Computation Process

Figure 16:
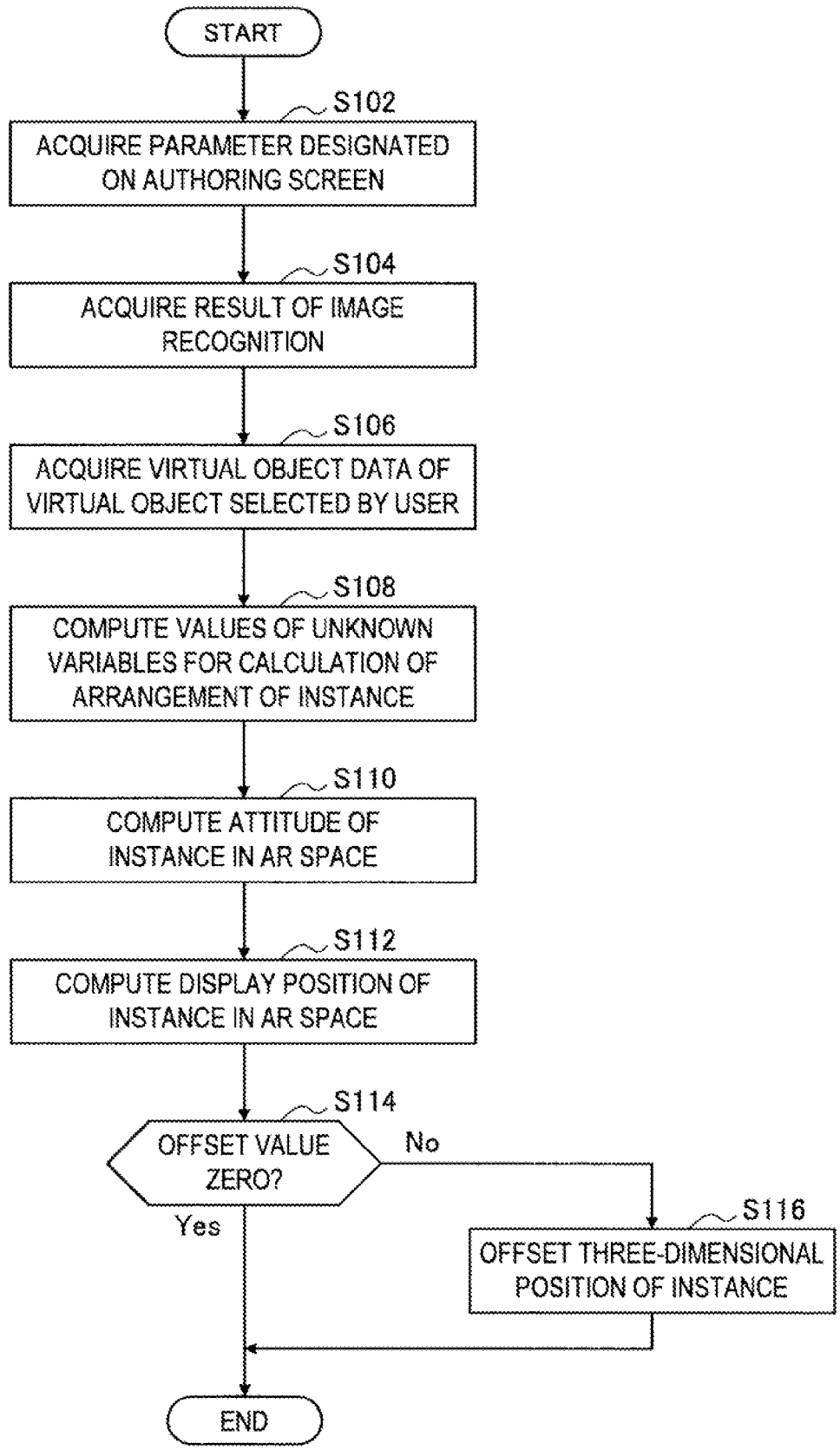
FIG. 16 is a flowchart showing an exemplary flow of a position/attitude computation process in accordance with an embodiment.

Referring to FIG. 16, first, the computation unit 170 acquires from the authoring unit 160 a parameter designated by a user on the authoring screen (step S102). A parameter acquired herein is typically one or more two-dimensional designated positions that designate the contacted face, the contact position, and the end point of the reference line arrangement vector. In addition, the value of an offset designated by the user can also be acquired.

Then, the computation unit 170 acquires a result of image recognition from the image recognition unit 140 (step S104). The result of image recognition acquired herein includes the object ID of each real object in the input image, the position and the attitude of each real object in the real space, and the position and the attitude of the information processing device 100 (step S104).

Next, the computation unit 170 acquires virtual object data of a virtual object selected by the user on the authoring screen (step S106).

Next, the computation unit 170 computes the values of unknown variables for computation of the arrangement of an instance of the selected virtual object (step S108). The unknown variables include the ID of the contacted face, the contact position Y, and the reference line arrangement vector a described above. The ID of the contacted face can be identified as the ID of a real object corresponding to the designated position acquired in step S102. The contact position Y can be computed as a three-dimensional position corresponding to the designated position on the plane including the contacted face. The reference line arrangement vector a can be computed from two three-dimensional positions corresponding to two designated positions on the plane including the contacted face. Alternatively, some of the values of such variables can be automatically computed as preset values.

Next, the computation unit 170 computes an attitude transformation $R_0$ of the instance in the AR space by solving the aforementioned Formulae (2) to (4) using the reference line arrangement vector a and the values of known variables computed in step S108 (step S110). The known variables herein include a vector a' on the local coordinate system representing the direction of the reference line of the instance, a normal vector n of the contacted face on the global coordinate system, and a normal vector n' of the contact face on the local coordinate system.

Next, the computation unit 170 computes the three-dimensional position of the instance in the AR space by substituting the contact position Y computed in step S108, the attitude transformation $R_0$ computed in step S110, and the values of known variables into Formula (5) above (step S112). The three-dimensional position computed herein is the position $C_0$ of the origin of the instance on the local coordinate system on the global coordinate system. The known variables include the position Y' of the reference point of the instance on the local coordinate system defined by the virtual object data.

When an offset is not designated by a user (when the value of an offset is zero), the computation process by the computation unit 170 terminates (step S114). Meanwhile, when the value of an offset that is not zero is designated, the computation unit 170 offsets the three-dimensional position $C_0$ of the instance in the normal direction of the contacted face by the designated value of the offset (step S116).

Note that when a second contacted face is designated, the attitude of the instance can be computed so that two contact faces of the instance are in contact with the two respective contacted faces instead of the processes of and after step S110. The position of the instance can be computed so that, for example, a line segment that connects the contact position Y on the first contact face and the position of the reference point of the instance becomes perpendicular with respect to the second contact face. Further, when a third contacted face is further designated, the three-dimensional position of the instance can be computed so that a third contact face of the instance is in contact with the designated third contacted face.

<5. Generation of Instance Data>

The authoring unit 160, when the three-dimensional position and the attitude of an instance of a virtual object in the AR space are computed, overlays the instance on the input image displayed on the authoring screen in accordance with the computed three-dimensional position and attitude. The position at which the instance is overlaid on the screen can be computed from the three-dimensional position and the attitude of the instance through projection transformation on the basis of the aforementioned relational expression (6) of the pinhole model. Then, when a user who has checked the screen issues an instruction for saving data, the authoring Unit 160 causes the storage medium to store the instance data representing the three-dimensional position and the attitude of the instance.

Figure 17:
FIG. 17 is an explanatory diagram showing a data example of instance data in accordance with an embodiment.

FIG. 17 is an explanatory diagram showing a data example of the instance data in accordance with this embodiment. FIG. 17 shows instance data ISD including data about four instances IS11, IS12, IS13, and IS21. The instance data ISD includes six data items: "instance ID," "object ID," "coordinate type," "associated object," "position," and "attitude." The "instance ID" is an identifier for uniquely identifying each instance. The "object ID" is the ID of a virtual object associated with each instance, and indicates which instance of a virtual object each instance is. In the example of FIG. 17, instances IS11, IS12, and IS13 are instances of the virtual object V1. The instance IS21 is an instance of the virtual object V2. The "coordinate type" indicates either one of "global" or "local." The position and the attitude of an instance whose "coordinate type" is "global" are stored as values on the global coordinate system. Meanwhile, the position and the attitude of an instance whose "coordinate type" is "local" are stored as values of a real object associated with the instance on the local coordinate system. The "associated object" is the object ID of a real object associated with the instance when the "coordinate type" of the instance is "local." It is also possible to use, instead of the ID of the associated object, the three-dimensional position of the associated object on the global coordinate system. The "position" is the three-dimensional position of each instance (on the global coordinate system or on the local coordinate system of the associated object). The "attitude" is a rotation matrix or a quaternion representing the attitude of each instance in the AR space.

The value of the "coordinate type" is determined in accordance with a mode that can be set before an instruction for saving data is issued. When a user wants to arrange an instance in the AR space in a fixed manner, he can set the mode to "global mode." In this case, the "coordinate type" becomes "global," and the three-dimensional position and the attitude of the instance are stored as values on the global coordinate system. If the instance data is stored in the "global mode," it becomes possible for a user terminal to, when an end user. uses AR content, determine the display position of the instance on the screen on the basis of the position and the attitude of the terminal without performing object recognition from the input image.

Meanwhile, in the "local mode," the "coordinate type" of the instance data is "local," the values of the three-dimensional position and the attitude of the instance are transformed into values of the associated object on the local coordinate system, and the values after the transformation are stored. A real object that is associated with an instance in the "local mode" can be the aforementioned contacted real object. If the instance data is stored in the "local mode," it becomes possible for a user terminal to, when an end user uses AR content, determine the display position of the instance on the screen on the basis of object recognition from the input image even when the user terminal doe not have a positioning function such as a GPS function. In this case, a display of the instance can be more accurately overlaid on the associated object on the screen without the influence of errors in the positioning function. Further, it is also possible to create AR content in which an instance moves such that it follows a dynamic real object.

<6. Operation Scenario>

Next, five exemplary scenarios of an authoring operation that uses a user interface provided in this embodiment will be described.

(1) First Scenario

In the first scenario, a user designates, after selecting a virtual object, only a designated position corresponding to the position of a reference point of an instance of the virtual object on the authoring screen.

Figure 18:
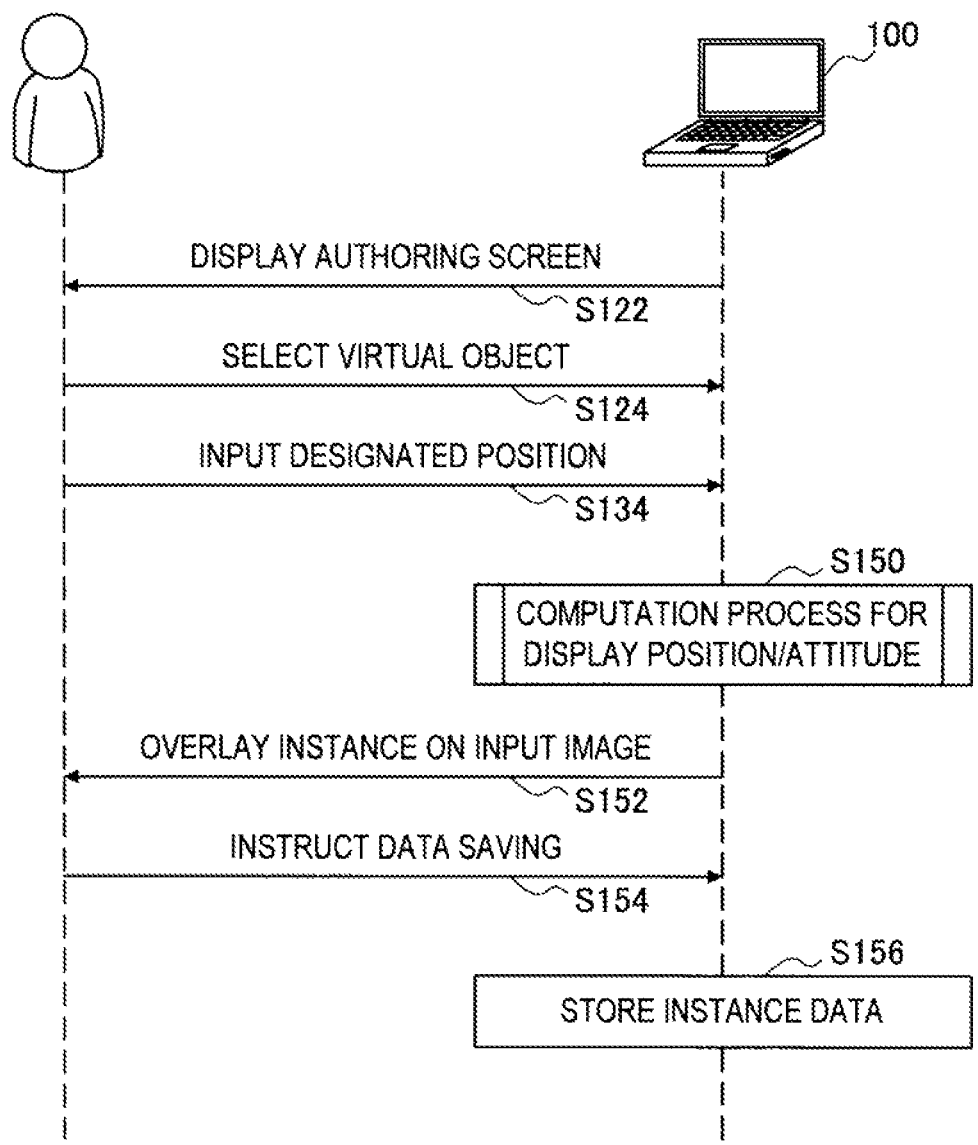
FIG. 18 is a sequence diagram illustrating a first scenario of an authoring operation.
Figure 19:
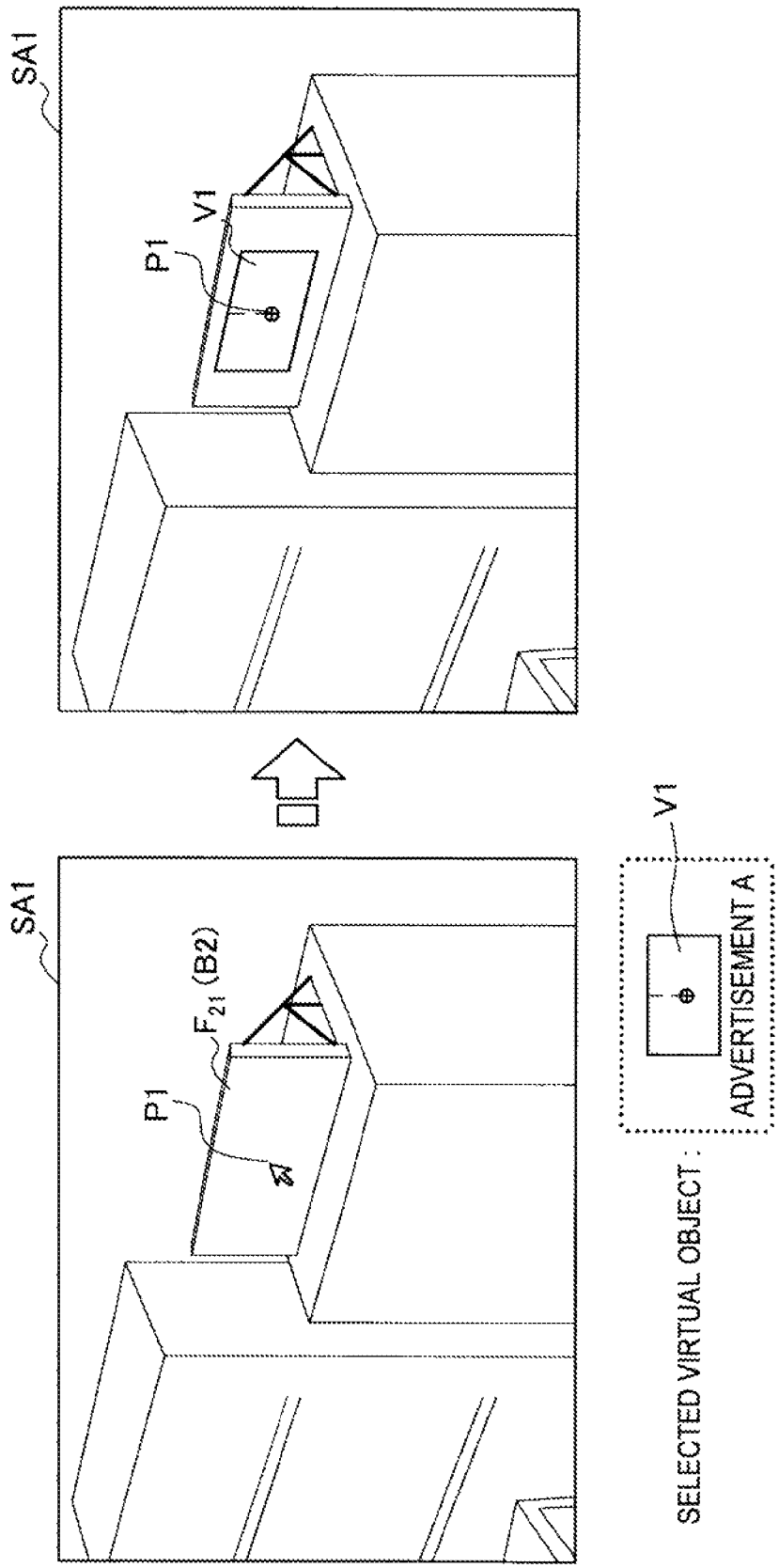
FIG. 19 is an explanatory diagram showing an example of an image displayed in the first scenario.

FIG. 18 is a sequence diagram illustrating the first scenario of an authoring operation. In addition, FIG. 19 is an explanatory diagram showing an example of an image displayed on the authoring screen in the first scenario.

Referring to FIG. 18, first, the user interface unit 150 of the information processing device 100 displays an authoring screen such as the one exemplarily shown in FIG. 14 to a user using the display unit 112 (step S122).

Next, the user selects a virtual object to be arranged in the AR space from the virtual object list area on the authoring screen (S124). Note that when the virtual object has a plurality of contact faces, the user can further select a single contact face from among the plurality of contact faces. In the example of FIG. 19, the virtual object V1 is selected.

Next, the user designates a position at which the selected virtual object is to be arranged in the input image area on the authoring screen through an operation such as a click or a tap (S134). Selection of a virtual object and input of a designated position can also be performed through a single-stroke operation, e.g., drag and drop from the virtual object list area. The left part of FIG. 19 shows a designated position P1 designated by the user.

Next, the computation unit 170 executes the position/attitude computation process described with reference to FIG. 16 (step S150). In the position/attitude computation process, ID of a contacted face can be identified as the ID of a real object corresponding to the designated position P1 (a face $F_{21}$ in FIG. 19). The contact position can be identified as a three-dimensional position on the contacted face $F_{21}$ corresponding to the designated position P1. A reference line arrangement vector can be automatically identified as a preset value.

Then, when the computation unit 170 has computed the three-dimensional position and the attitude of an instance, the user interface unit 150 overlays the instance of the virtual object on the input image area of the authoring screen in accordance with the computed three-dimensional position and attitude (step S152). The right part of FIG. 19 shows a view in which an instance of the virtual object V is overlaid on the contacted face $F_1$.

After that, the authoring unit 160, upon receiving an instruction from the user to save data (step S154), generates instance data such as the one exemplarily shown in FIG. 17, and causes the storage medium to store the generated instance data (step S156). The user can, before issuing an instruction for saving data, return to step S124 or step S134 to again select a virtual object or input a designated position.

The aforementioned first scenario is the simplest scenario in which a user has only to designate a single point on the screen for arranging a virtual object. In the first scenario, a contacted face and a contact position are designated concurrently. Such a scenario is advantageous in that the operation is quite intuitive and easy to perform for the user.

(2) Second Scenario

In the second scenario, a user separately designates a contacted face and a contact position. In addition, the "coordinate type" of the generated instance data is "local."

Figure 20:
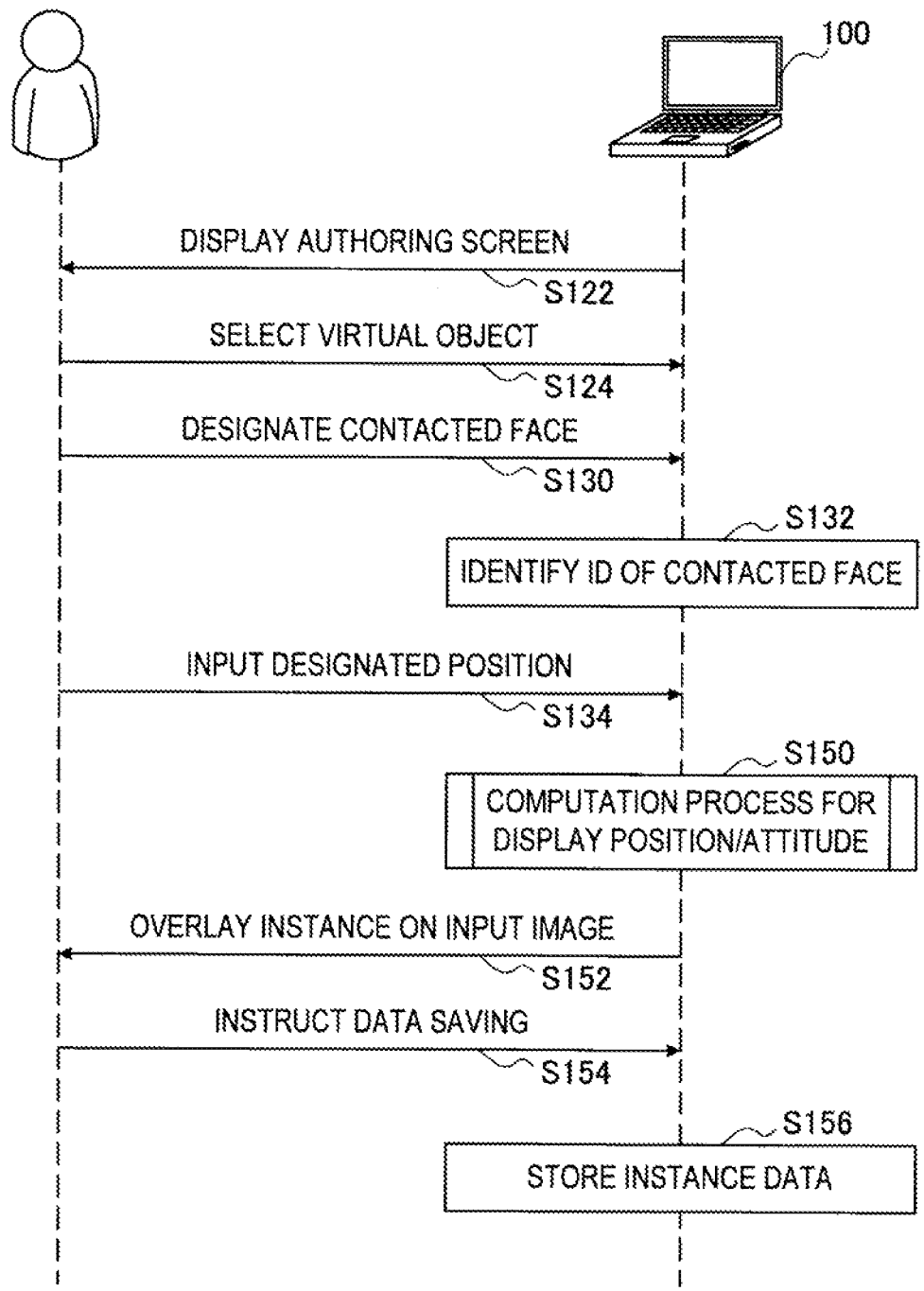
FIG. 20 is a sequence diagram illustrating a second scenario of an authoring operation.
Figure 21:
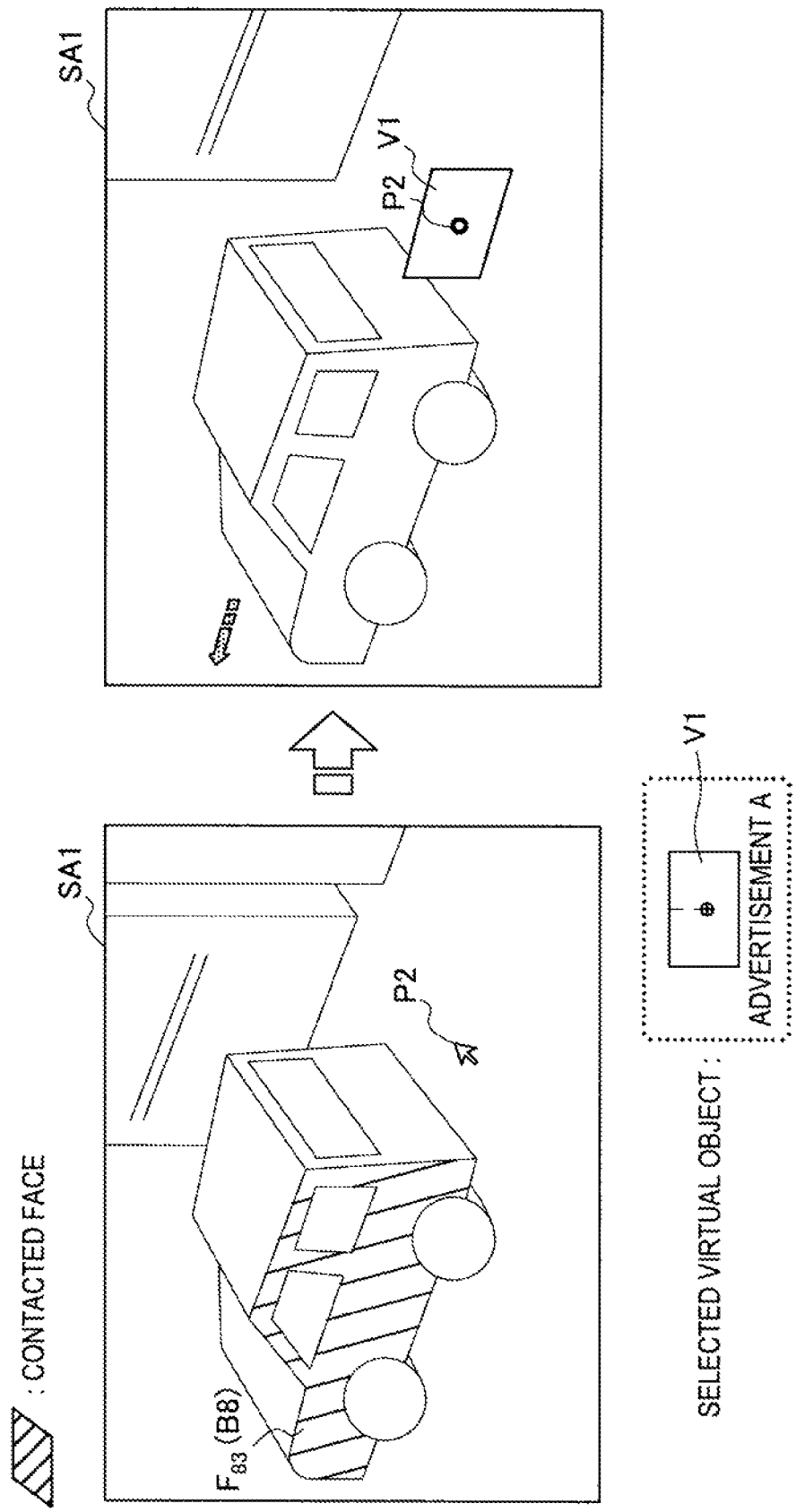
FIG. 21 is an explanatory diagram showing an example of an image displayed in the second scenario.

FIG. 20 is a sequence diagram illustrating the second scenario of an authoring operation. FIG. 21 is an explanatory diagram showing an example of an image displayed on the authoring screen in the second scenario.

Referring to FIG. 20, first, the user interface unit 150 of the information processing device 100 displays an authoring screen such as the one exemplarily shown in FIG. 14 to a user using the display unit 112 (step S122).

Next, the user selects a virtual object to be arranged in the AR space from the virtual object list area on the authoring screen (step S124). In the example of FIG. 21, the virtual object V1 is selected.

Next, the user designates a contacted face in the input image area on the authoring screen through an operation such as a click or a tap (step S130). Selection of a virtual object and designation of a contacted face can also be performed through a single-stroke operation, e.g., drag and drop from the virtual object list area. In the example of FIG. 21, a face $F_{83}$ of the real object B8 designated by the user is hatched.

Next, the user further designates a position at which the selected virtual object is to be arranged in the input image area (step S134). The position designated herein can be either a position of the inner side or the outer side of the contacted face on the screen. The left part of FIG. 21 shows a designated position P2 on the outer side of the contacted face $F_{83}$ designated by the user.

Next, the computation unit 170 executes the position/attitude computation process described with reference to FIG. 16 (step S150). In the position/attitude computation process, a contact position is identified as a three-dimensional position corresponding to the designated position P2 on the plane including the contacted face $F_{83}$ in the AR space. A reference line arrangement vector can be automatically identified as a present value.

When the computation unit 170 has computed the three-dimensional position and the attitude of an instance, the user interface unit 150 overlays the instance of the virtual object in the input image area on the authoring screen in accordance with the computed three-dimensional position and attitude (step S152). The right part of FIG. 21 shows a view in which an instance of the virtual object V1 is overlaid on the input image.

After that, the authoring unit 160, upon receiving an instruction from the user to save data (step S154), generates instance data such as the one exemplarily shown in FIG. 17, and causes the storage medium to store the generated instance data (step S156). In this scenario, instance data of an instance of the virtual object V1 is associated with the real object B8, and has the three-dimensional position and the attitude of the real object B8 on the local coordinate system (for example, see the row of instance ID="IS13" in the instance data ISD of FIG. 17). Accordingly, the position of the instance of the virtual object V1 will change within the AR space such that it follows the moving real object B8.

In the aforementioned second scenario, a contacted face and a contact position are designated in separate steps. Accordingly, a position on the outer side of the polygon of the contacted face can be designated as a contact position. In addition, in the second scenario, the position and the attitude of an instance of a virtual object are represented by the local coordinate system of the associated object. Thus, it is possible to easily create AR content in which the position of an instance changes such that it follows the associated moving object.

(3) Third Scenario

In the third scenario, a user concurrently designates a contacted face and a contact position, and further designates a reference line arrangement vector on the authoring screen.

Figure 22:
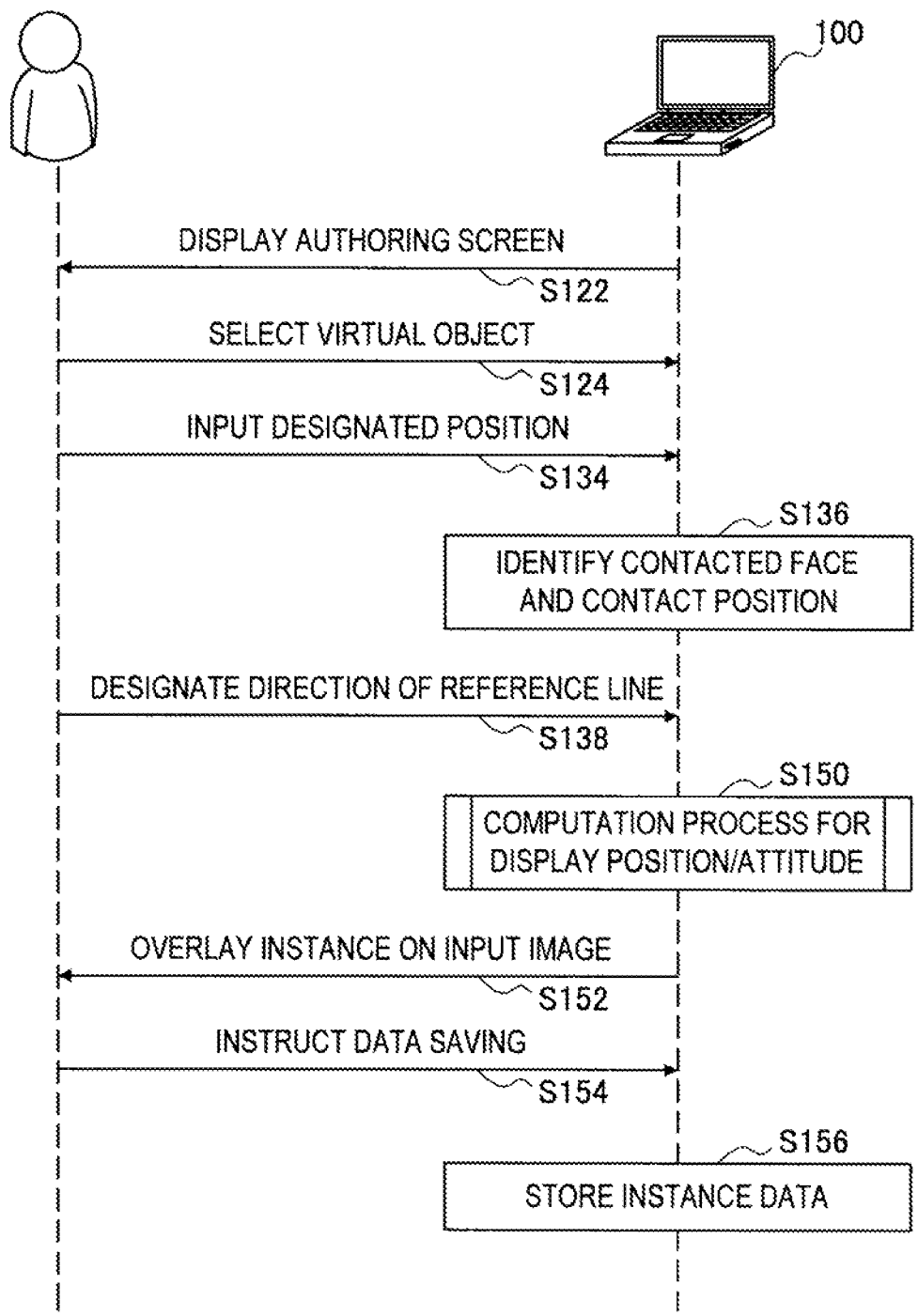
FIG. 22 is a sequence diagram illustrating a third scenario of an authoring operation.
Figure 23:
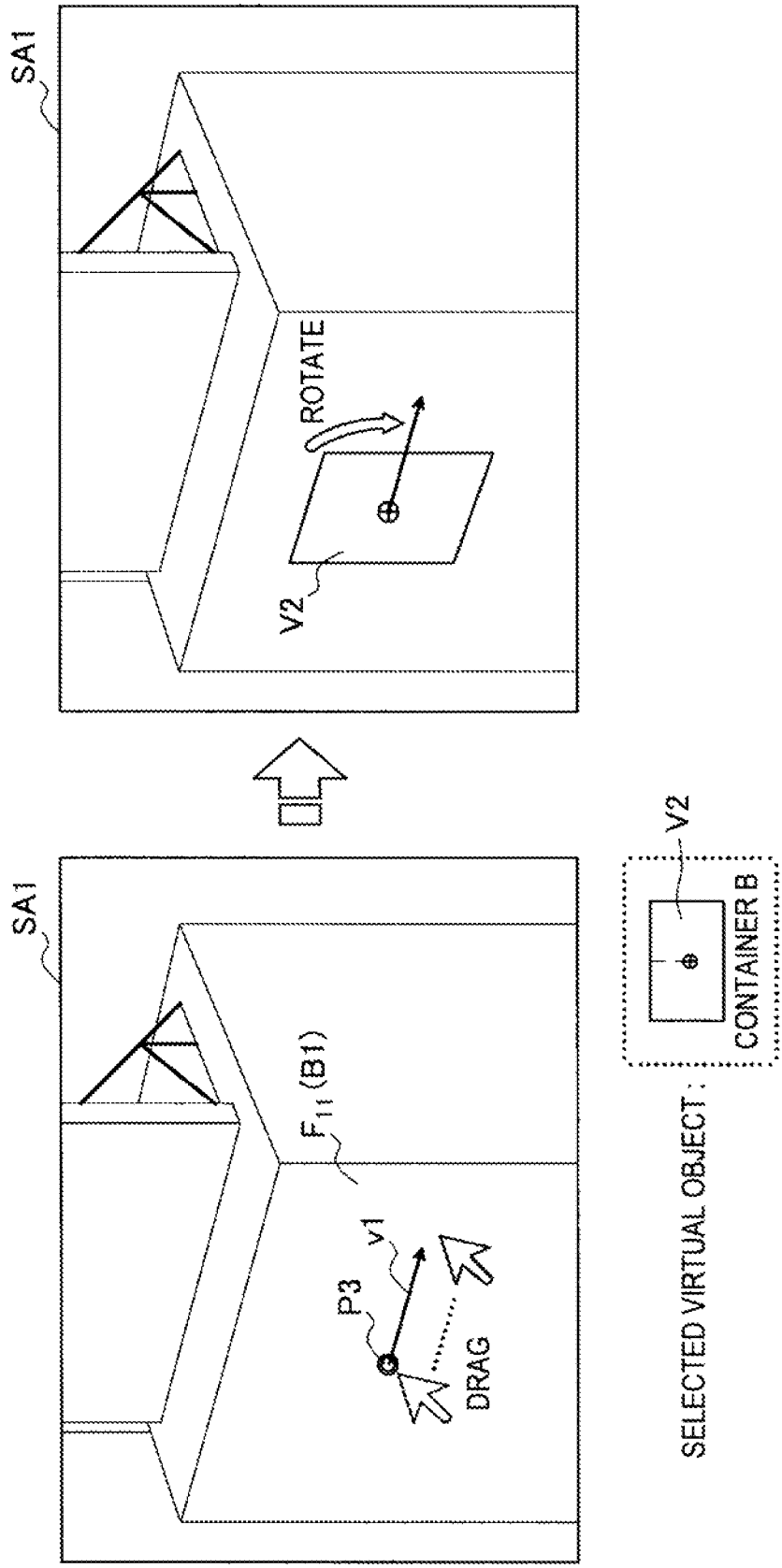
FIG. 23 is an explanatory diagram showing an example of an image displayed in the third scenario.

FIG. 22 is a sequence diagram illustrating the third scenario of an authoring operation. FIG. 23 is an explanatory diagram showing an example of an image displayed on the authoring screen in the third scenario.

Steps S122 to S134 of the third scenario can be similar to those in the first scenario. Referring to FIG. 23, in this scenario, the virtual object V2 is selected by a user. In addition, a designated position P3 on the face $F_{11}$ of the real object B1 is designated by the user.

The computation unit 170 identifies the face $F_{11}$ corresponding to the designated position P3 as a contacted face. In addition, the computation unit 170 identifies a three-dimensional position corresponding to the designated position P3 on the plane including the contacted face $F_{11}$ as a contact position (step S136).

Further, in this scenario, the user designates the direction of a reference line through an operation such as a drag or a multi-touch (step S138). In the example of FIG. 23, a vector V1 is designated as the direction of a reference line.

Next, the computation unit 170 executes the position/attitude computation process described with reference to FIG. 16 (step S150). In the position/attitude computation process, a reference line arrangement vector can be computed as a unit vector on a plane including the contacted face in the AR space corresponding to the vector V1 designated in step S138.

The following steps S152 to S156 can also be similar to those in the first scenario. In the example of FIG. 23, an instance of the virtual object V2 is overlaid so that the reference point coincides with the contact position corresponding to the designated position P3 on the contacted face $F_{11}$. The attitude of the instance is rotated so that the reference line coincides with the reference line arrangement vector in the AR space.

In the aforementioned third scenario, a user can freely change even the attitude of a virtual object by performing an operation for designating a reference line arrangement vector. The operation for designating a reference line arrangement vector can be realized through a simple operation such as a drag or a multi-touch on the screen. Alternatively, when a contacted face and a contact position are made to be designated upon initiation of a drag, it becomes possible to designate all of the contacted face, the contact position, and the reference line arrangement vector through a single-stroke drag operation.

Note that in this scenario, a virtual object corresponding to a container having a field for displaying a given image is used as an example. The container can also be used in other scenarios. When an instance of such a container is arranged in the AR space, it becomes possible to easily change the AR content only by replacing an image set on the container even after the AR content is authored.

(4) Fourth Scenario

In the fourth scenario, a user further designates, after designating a reference line arrangement vector as in the third scenario, an offset on the authoring screen.

Figure 24:
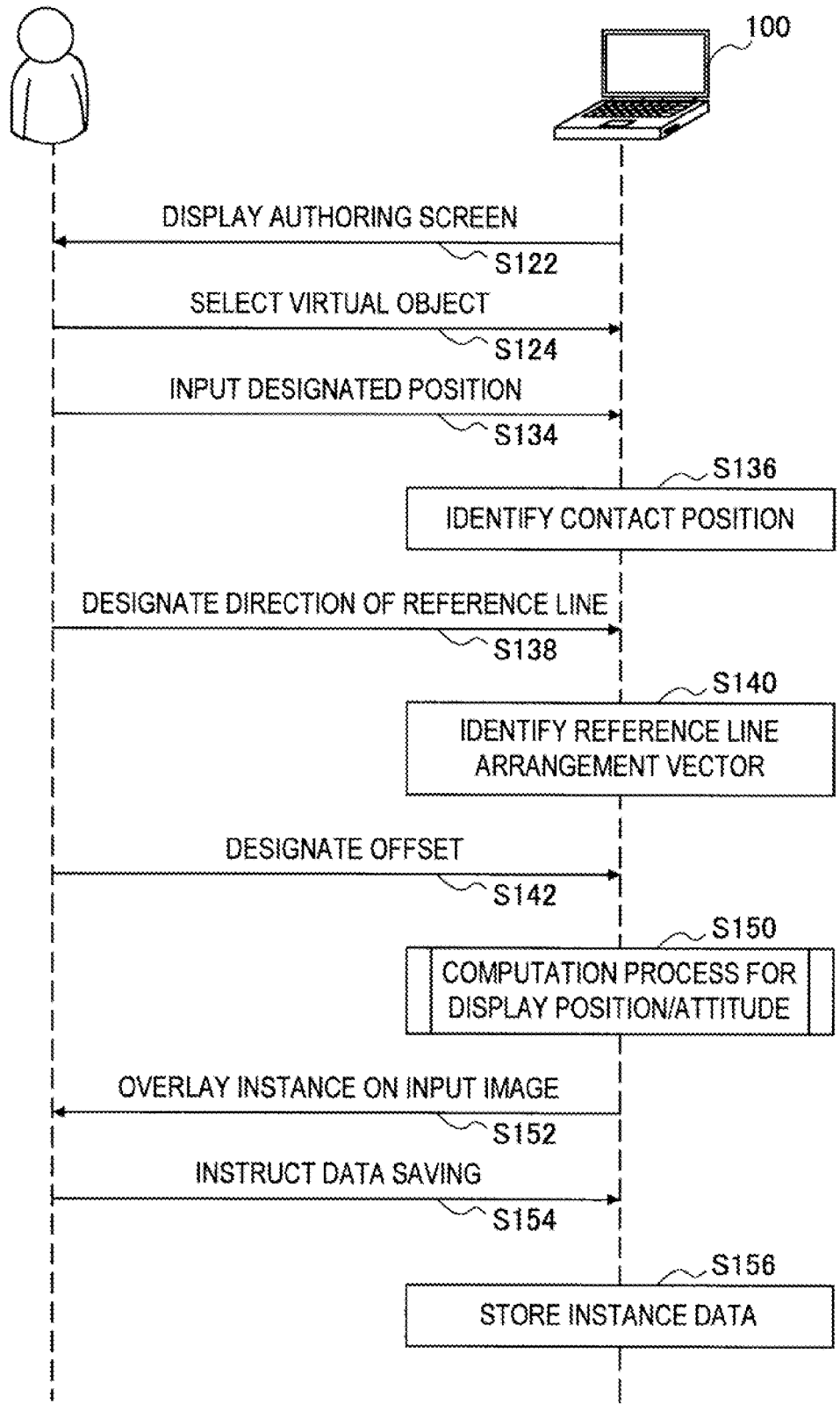
FIG. 24 is a sequence diagram illustrating a fourth scenario of authoring operation.
Figure 25:
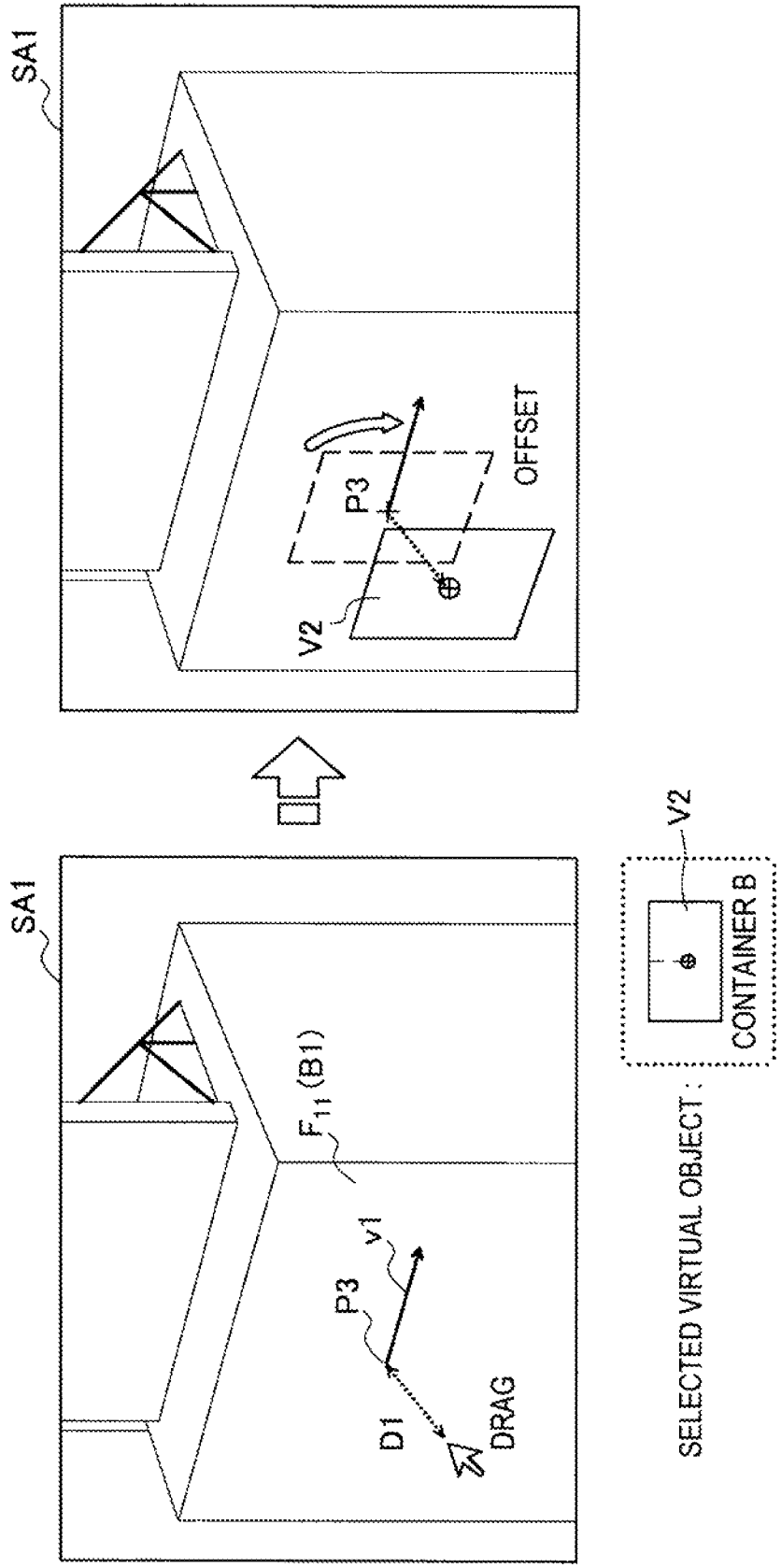
FIG. 25 is an explanatory diagram showing an example of an image displayed in the fourth scenario.

FIG. 24 is a sequence diagram illustrating the fourth scenario of an authoring operation. FIG. 25 is an explanatory diagram showing an example of an image displayed on the authoring screen in the fourth scenario.

Steps S122 to S138 of the fourth scenario can be similar to those in the third scenario. Referring to FIG. 25, in this scenario, the virtual object V2 is selected by a user. In addition, a designated position P3 on the face $F_{11}$ of the real object B1 is designated by the user. Further, a vector v1 representing the direction of a reference line is designated.

The computation unit 170 identifies a reference line arrangement vector from two points on the contacted face $F_{11}$ in the AR space corresponding to the start point and the end point of the vector v1 (step S140).

Further, in this scenario, the user designates an offset of the position of the reference point of the instance from the contact position (step S142). The value of the offset can be designated by an operation such as a click of a new point or a drag for a distance corresponding to the offset. In the example of FIG. 25, the value of the designated offset is D1.

Next, the computation unit 170 executes the position/attitude computation process described with reference to FIG. 16 (step S150). In the position/attitude computation process, the reference point of the instance is offset from the contact position in the normal direction of the contacted face.

The following steps S152 to S156 can also be similar to those in the third scenario. In the example of FIG. 25, the reference point of the instance of the virtual object V2 is offset from the contact position corresponding to the designated position P3 on the contacted face $F_{11}$ by the distance D1.

In the aforementioned fourth scenario, a user can easily arrange an instance of a virtual object even at a position away from a plane including the contacted face by additionally designating an offset.

(5) Fifth Scenario

In the fifth scenario, a user designates two contacted faces.

Figure 26:
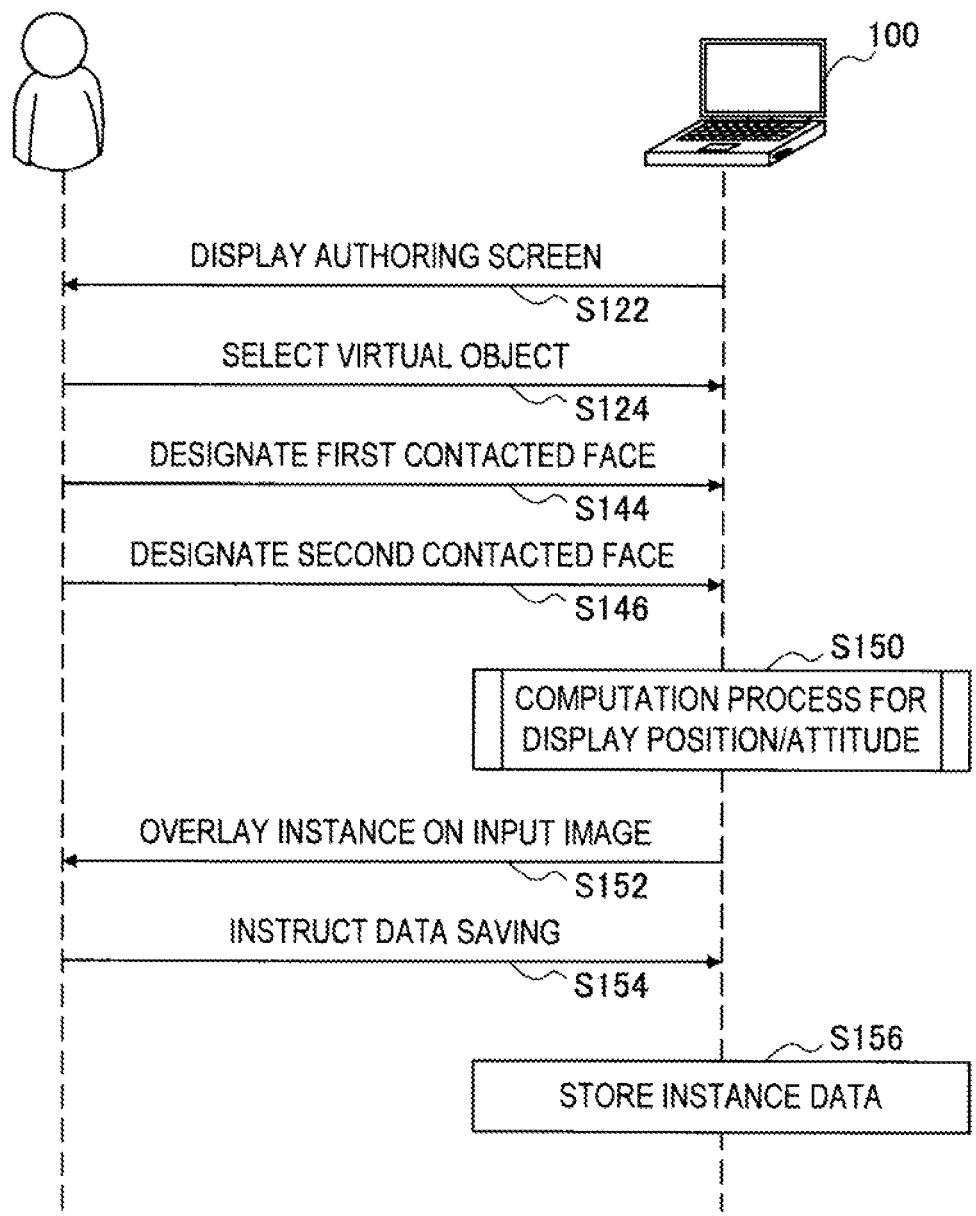
FIG. 26 is a sequence diagram illustrating a fifth scenario of an authoring operation.

FIG. 26 is a sequence diagram illustrating the fifth scenario of an authoring operation. In addition, FIG. 27 is an explanatory diagram showing an example of an image displayed on the authoring screen in the fifth scenario.

Referring to FIG. 26, first, the user interface unit 150 of the information processing device 100 displays an authoring screen such as the one exemplarily shown in FIG. 14 to a user using the display unit 112 (step S122).

Next, the user selects a virtual object to be arranged in the AR space from the virtual object list area on the authoring screen (step S124). In the example of FIG. 27, the virtual object V3 is selected. In this scenario, the user further selects two contact faces of the selected virtual object.

Next, the user designates a first contacted face in the input image area on the authoring screen (step S144). In addition, the user designates a second contacted face in the input image area (step S146). In the example of FIG. 27, as a result of a designated position P4 having been designated, the face $F_{13}$ of the real object B1 is designated as a first contacted face. In addition, as a result of a designated position P5 having been designated, the face $F_{21}$ of the real object B2 is designated as a second contacted face.

Next, the computation unit 170 executes the aforementioned position/attitude computation process (step S150). In the position/attitude computation process, the three-dimensional position and the attitude of an instance of a virtual object are computed so that two contact faces of the instance are in contact with the two respective contacted faces.

The following steps S152 to S156 can be similar to those in the other scenarios. In the example of FIG. 27, an instance of the virtual object V3 is overlaid so that contact faces of the instance of the virtual object V3 are in contact with the two respective contacted faces $F_{13}$ and $F_{21}$.

In the aforementioned fifth scenario, a user can arrange a virtual object in the AR space through a simple operation of designating two points in the input image. Such operation can also be realized through a simple operation such as a click or a tap.

(6) Variation

Note that the size of an instance of a virtual object can also be adjustable on the aforementioned authoring screen. The size of an instance of a virtual object can be changed through an operation of a user such as a drag, for example, on the authoring screen. Alternatively, for example, the computation unit 170 can enlarge or shrink the size of an instance of a virtual object in accordance with the size of the contacted face. In the example of FIG. 28, the size of an instance of the virtual object V1 arranged at the contact position P1 on the contacted face $F_{21}$ of the real object B2 is automatically enlarged in accordance with the size of the contacted face $F_{21}$. The authoring unit 160 can also cause the instance data to include the magnification of the size (or just the size) of the instance changed in this manner.

<7. Conclusion>

Heretofore, an embodiment of the present disclosure has been described in detail with reference to FIGS. 1 to 28. According to this embodiment, an authoring screen for displaying an input image of a real space is presented to a user. Then, the user designates a position at which a virtual object is to be arranged on the authoring screen. The information processing device 100 computes the three-dimensional position of the virtual object in the AR space from the designated position designated by the user, and associates the computed three-dimensional position with the virtual object to store the three-dimensional position in a storage medium. Thus, the user can arrange the virtual object at a desired position in the AR space through a simple operation while viewing the input image displayed on the authoring screen. Accordingly, it becomes possible for even an ordinary user having no specialized knowledge to easily author AR content. In addition, as a user can arrange a virtual object while viewing the display of the screen without having to perform complex computation such as coordinate transformation, errors in the arrangement of the virtual object can also be avoided.

According to this embodiment, a virtual object is arranged at a three-dimensional position corresponding to the aforementioned designated position on a plane of a real object in the input image, the plane including a face designated by a user. Thus, the user can adequately arrange the virtual object in the AR space only by designating a face of a real object on which the virtual object is to be arranged and designating the aforementioned designated position. Further, it is also possible to combine the designation of a face of a real object and the designation of the aforementioned designated position as a single operation to further simplify the operation performed by the user.

In addition, according to this embodiment, when a vector for determining the attitude of a virtual object in the AR space is designated on the authoring screen, the attitude of the virtual object in the AR space is further computed using the vector. Designation of the vector can be performed through a simple operation such as a drag or a multi-touch on the screen. Thus, it is possible for even an ordinary user having no specialized knowledge to easily edit not only the three-dimensional position but also the attitude of the virtual object in the AR space.

Further, according to this embodiment, the three-dimensional position of a virtual object in the AR space can be offset in accordance with the value of an offset designated on the authoring screen. Thus, the user can arrange the virtual object at various positions in the AR space without being restricted to the designated contacted face of the real object.

Furthermore, according to this embodiment, the three-dimensional position of a virtual object can be stored either as the absolute position in the AR space or the relative position with respect to a real object in the real space associated with the virtual object. When the three-dimensional position of a virtual object is stored as the relative position with respect to a real object in the real space, it becomes possible to create, for example, AR content in which the virtual object moves such that it follows a dynamic real object.

Moreover, according to this embodiment, the position and the attitude of each real object in the input image in the real space can be recognized by checking the input image against model data, which represents the feature of the appearance of each of one or more real objects in the real space. Thus, a position corresponding to the designated position on a plane including the designated face can be computed using a result of such image recognition.

Note that a series of control processes performed by the information processing device 100 described in this specification can be realized using any of software, hardware, or a combination of software and hardware. A program that constitutes software is stored in, for example, a storage medium, which is provided inside or outside of each device, in advance. Then, each program is read into RAM (Random Access Memory) in execution and is executed by a processor such as a CPU (Central Processing Unit).

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The present disclosure contains subject matter related to that disclosed in Japanese Priority Patent Application JP 2011-030006 filed in the Japan Patent Office on Feb. 15, 2011, the entire content of which is hereby incorporated by reference.

What is claimed is:

1. An information processing device comprising:
   a data acquisition unit configured to acquire model data representing a feature of an appearance of each of one or more real objects in a real space;
   an image acquisition unit configured to acquire an input image of the real space captured with an imaging device;
   a recognition unit configured to recognize a position and an attitude of each real object in the real space in the input image by checking the input image against the model data;
   a user interface unit configured to:
      display the input image on a screen of a display device; and
      detect a user input on the screen a contact face of a real object in the input image, a contact position on the contact face in the input image, and an offset distance value;
   a computation unit configured to compute a three-dimensional position of a virtual object in an augmented reality space based on the contact face and contact position input by the user on the screen, wherein a position of a reference point in the augmented reality space is offset by the offset distance value from the contact position in a first normal line perpendicular to the contact face; and
   an authoring unit configured to associate the three-dimensional position of the virtual object computed by the computation unit with the virtual object to store the three-dimensional position in a storage medium.

2. The information processing device according to claim 1, wherein
   the user interface unit prompts the user to designate one of faces of the real object included in the input image as a first face, and
   the three-dimensional position computed by the computation unit is a position which is on a plane including the first face in the augmented reality space and is corresponding to the contact position.

3. The information processing device according to claim 2, wherein
   the user interface unit further prompts the user to designate a vector on the screen,
   the computation unit further computes an attitude of the virtual object in the augmented reality space using the designated vector, and
   the authoring unit further stores the attitude of the virtual object computed by the computation unit in the storage medium.

4. The information processing device according to claim 3, wherein the computation unit computes the attitude of the virtual object in the augmented reality space so that a second normal line of at least one face of the virtual object becomes parallel with a third normal line of the first face when the virtual object is displayed.

5. The information processing device according to claim 4, wherein
   the user interface unit further prompts the user to designate a distance between the at least one face of the virtual object and the plane including the first face, and
   the computation unit offsets, when the distance is not zero, the three-dimensional position of the virtual object in accordance with the distance.

6. The information processing device according to claim 2, wherein
   the user interface unit detects two designated positions designated by the user on the screen,
   the computation unit computes the three-dimensional position and an attitude of the virtual object in the augmented reality space so that faces of a real object included in the input image corresponding to the two respective designated positions are in contact with two faces of the virtual objects, and
   the authoring unit stores the three-dimensional position and the attitude of the virtual object computed by the computation unit in the storage medium.

7. The information processing device according to claim 1, wherein
   the user interface unit prompts the user to designate the real object in the real space associated with the virtual object, and
   the three-dimensional position is stored as a relative position with respect to the real object designated by the user.

8. The information processing device according to claim 2, wherein the computation unit further computes a size of the virtual object in the augmented reality space when the virtual object is displayed, in accordance with a size of the first face in the real space.

9. An authoring method comprising:
   acquiring model data representing a feature of an appearance of each of one or more real objects in a real space;
   acquiring an input image of the real space captured with an imaging device;
   recognizing a position and an attitude of each real object in the real space in the input image by checking the input image against the model data;
   displaying the input image on a screen of a display device;
   detecting a user input on the screen a contact face of a real object in the input image, a contact position on the contact face in the input image, and an offset distance value;
   computing a three-dimensional position of a virtual object in an augmented reality space based on the contact face and contact position input by the user on the screen, wherein a position of a reference point in the augmented reality space is offset by the offset distance value from the contact position in a first normal line perpendicular to the contact face; and
   associating the computed three-dimensional position of the virtual object with the virtual object to store the three-dimensional position in a storage medium.

10. A non-transitory computer readable medium containing a program for causing a computer that controls an information processing device connected to a display device to function as:
   a data acquisition unit configured to acquire model data representing a feature of an appearance of each of one or more real objects in the real space;
   an image acquisition unit configured to acquire an input image of a real space captured with an imaging device;
   a recognition unit configured to recognize a position and an attitude of each real object in the real space in the input image by checking the input image against the model data;
   a user interface unit configured to:
      display the input image on a screen of the display device; and
      detect a user input on the screen a contact face of a real object in the input image, a contact position on the contact face in the input image, and an offset distance value;

a computation unit configured to compute a three-dimensional position of a virtual object in an augmented reality space based on the contact face and contact position input by the user on the screen, wherein a position of a reference point in the augmented reality space is offset by the offset distance value from the contact position in a first normal line perpendicular to the contact face; and an authoring unit configured to associate the three-dimensional position of the virtual object computed by the computation unit with the virtual object to store the three-dimensional position in a storage medium.

\* \* \* \* \*